US010024044B2

(12) United States Patent
Fisher

(10) Patent No.: US 10,024,044 B2
(45) Date of Patent: Jul. 17, 2018

(54) DEVICE AND METHOD FOR SECURING A DRAIN TILE

(71) Applicant: Mark Fisher, Somonauk, IL (US)

(72) Inventor: Mark Fisher, Somonauk, IL (US)

( * ) Notice: Subject to any disclaimer, the term of this patent is extended or adjusted under 35 U.S.C. 154(b) by 451 days.

(21) Appl. No.: 14/852,742

(22) Filed: Sep. 14, 2015

(65) Prior Publication Data

US 2016/0076687 A1     Mar. 17, 2016

Related U.S. Application Data

(60) Provisional application No. 62/049,965, filed on Sep. 12, 2014.

(51) Int. Cl.
*F16L 33/26* (2006.01)
*E03F 9/00* (2006.01)
*F16L 25/00* (2006.01)
*F16L 37/14* (2006.01)

(52) U.S. Cl.
CPC ............ *E03F 9/00* (2013.01); *F16L 25/0045* (2013.01); *F16L 33/26* (2013.01); *F16L 37/142* (2013.01); *F16L 37/144* (2013.01)

(58) Field of Classification Search
CPC ... F16L 33/23; F16L 25/0045; F16L 37/1205; F16L 37/565; F16L 23/006; F16L 37/142; F16L 34/146; F16L 37/14; F16L 37/08; F16L 37/12; F16L 37/127; F16L 37/148
USPC .................................................. 285/903, 311
See application file for complete search history.

(56) References Cited

U.S. PATENT DOCUMENTS

| | | | | |
|---|---|---|---|---|
| 1,431,003 A | * | 10/1922 | Joseph | F16L 9/14 285/903 |
| 3,144,262 A | * | 8/1964 | Reynolds | F16L 33/12 285/311 |
| 3,874,712 A | * | 4/1975 | Watson | F16L 33/12 285/311 |
| 4,423,891 A | * | 1/1984 | Menges | F16L 25/0045 285/903 |
| 4,443,031 A | * | 4/1984 | Borsh | F16L 25/0045 285/903 |

(Continued)

*Primary Examiner* — David Bochna
(74) *Attorney, Agent, or Firm* — Donald Flaynik

(57) ABSTRACT

A securing device is disclosed having a flange mountable on a suction-providing source, and having pipe members that detachably receive a corrugated pipe such as a drain tile. A major or outer pipe is concentrically and integrally joined to, and extends perpendicularly from the flange. The outer pipe includes a rod receiving slot extending circumferentially and radially through a predetermined portion of the outer pipe. A minor or inner pipe is concentrically and integrally joined to, and extends perpendicularly from the flange such that the inner pipe is concentrically disposed inside the outer pipe. A latch is mounted on the outer pipe and is and is movable between a latched position and a fully unlatched position. A securing rod is pivotally connected to the outer pipe and is operatively associated with the latch subassembly so as to be movable from a secured position to a released position. When the latch subassembly is in the fully unlatched position, the rod is in the released position, and when the latch subassembly is in the latched position, the rod is in the secured position to detachably secure the position of a drain tile upon the inner pipe.

20 Claims, 19 Drawing Sheets

(56) References Cited

U.S. PATENT DOCUMENTS

| | | | | |
|---|---|---|---|---|
| 4,904,000 | A * | 2/1990 | Matsui | H02G 3/0691 |
| | | | | 285/903 |
| 5,087,084 | A * | 2/1992 | Gehring | F16L 25/0045 |
| | | | | 285/903 |
| 5,356,183 | A * | 10/1994 | Cole | F16L 25/0045 |
| | | | | 285/903 |
| 5,632,512 | A * | 5/1997 | Guitoneau | F16L 25/0045 |
| | | | | 285/903 |
| 6,899,359 | B2 * | 5/2005 | Presby | F16L 25/0045 |
| | | | | 285/903 |
| 7,240,930 | B2 * | 7/2007 | Stravitz | F16L 25/0045 |
| | | | | 285/903 |
| 8,646,813 | B1 * | 2/2014 | Shemtov | F16L 25/08 |
| | | | | 285/903 |
| 2005/0184524 | A1 * | 8/2005 | Stravitz | F16L 25/0045 |
| | | | | 285/903 |
| 2015/0308598 | A1 * | 10/2015 | Lewis | F16L 33/23 |
| | | | | 285/257 |

* cited by examiner

DEVICE AND METHOD FOR SECURING A DRAIN TILE

This Utility Application is based on Provisional Application No. 62/049,965, filed on Sep. 12, 2014.

BACKGROUND OF THE INVENTION

1. Field of the Invention

This invention relates to a device and method for securing a drain tile to a conduit, and more particularly, to a securing device that is adapted for use with a drain tile, corrugated conduit or hose suitable for use with a suction device, suction vehicle or other suction source.

The securing device can be used with a myriad of conduits, including but not limited to, non-perforated drain tile having circular ribs disposed circumferentially and radially protruding about the length of the conduit; reinforced plastic hose having a single reinforcement rib protruding and disposed spirally about the length of the conduit; and virtually any conduit or hose having a protruding rib first end portion configured and dimensioned for use with the securing device and having a second end suitable for use with a suction device.

The securing device includes a securing mechanism constructed and arranged to secure drain tile or other suitable conduits or hoses to a flange subassembly operatively associated with a suction-providing source to extension of the suction to a location to be vacuumed. The securing mechanism ultimately secures the drain tile or corrugated conduit to the securing device via a portion of a securing rod member of the securing mechanism inserted through an aperture or groove in an outer or major pipe, such that the portion of the rod member is enabled to forcibly engage the drain tile between adjacent ribs, resulting in the longitudinal or axial position of the drain tile or corrugated conduit being maintained upon an inner or minor pipe concentric with the outer pipe of the securing device with both inner and outer pipes being axially aligned with and integrally secured to the same annular side of a pipe flange.

In a more preferred embodiment, the securing device provides a superior assembly for use in cleaning drain sewers, in that it provides a more readily adaptable extension of the operating range of a vacuum truck by permitting a releasable connection of drain tile or corrugated hose to the vacuum truck. In a most preferred embodiment, the device provides an assembly having a releasably moveable securing rod member disposed on the outer surface of the outer pipe and a rod receiving aperture or groove through the outer pipe. The rod and groove are cooperatively configured to promote engagement of the rod and drain tile or corrugated hose within an annulus defined by the inner surface of the outer pipe and an outer surface of the inner pipe, resulting in the drain tile or corrugated hose being maintained upon the inner pipe during the entire operation of the vacuum truck.

2. Background of the Prior Art

There is need for a drain tile securing device that can provide a combination of features facilitating convenient adaptation in the field with maximum adaptability to a plurality of conduit or hose types. Previously, there have been efforts to secure a drain tile or hose to a vacuum truck via improvisation in the field, however, these fail to provide the features and advantages of the present disclosure.

In a conventional system, a vacuum truck has tubing associated therewith that permit sewer cleaning without the need for additional apparatus when the truck can be positioned sufficiently proximate to the sewer to be cleaned. However, when the truck cannot be positioned sufficiently close to the sewer to be cleaned, a hose is commonly adapted to an 8-inch flange having an inner pipe extension sized to fit the hose. Securing the hose to the inner pipe extension is usually accomplished through duct tape.

The conventional system as described is generally workable but may suffer failure if the duct tape fails or, as often happens, when the suction applied to the hose is sufficiently great to suck the duct tape from its secured placement, moving it at least partially into the hose, thereby disrupting the seal. Moreover, removal of the duct tape when disengagement of the hose is preferred can be difficult and time-consuming.

A problem associated with such devices that precede the present disclosure is that they do not provide, in combination with the other features and advantages disclosed herein, a drain tile securing device that is readily fastened to a drain tile in sealable, releasable relation.

Another problem associated with such devices that precede the present invention is that they do not provide, in combination with the other features and advantages disclosed herein, a drain tile securing device that is readily removed from a drain tile without expenditure of undue amounts of manpower.

There is a demand, therefore, to overcome the foregoing problems while at the same time providing a drain tile securing device that is adaptable to a multiplicity of uses and that is also relatively low in cost to manufacture, and yet possesses extended durability.

SUMMARY OF THE INVENTION

In a preferred embodiment, a drain tile securing device is disclosed.

It is an object of the present invention to overcome many of the disadvantages associated with prior art devices that connect a drain tile to a vacuum truck. An object of the present invention is to provide a drain tile securing device that is adaptable to a multiplicity of uses while at the same time being relatively low in cost to manufacture, and yet possessing extended durability. A principal object of the present invention is to provide a drain tile securing device that is readily fastened to a drain tile in a sealable, releasable relation. A feature of the drain tile securing device is inner and outer concentric pipes axially aligned with and circumferentially secured to a pipe flange. Another feature of the device is that an annulus is configured between the inner and outer pipes, the annulus having a radial distance between an outer wall of the inner pipe and an inner wall of the outer pipe relatively larger than the drain tile wall thickness defined by the radial distance from an inner wall surface of the drain tile to the apex of a corresponding rib of the drain tile. Yet another feature of the device is that the inner pipe has a longitudinal dimension relatively longer than the longitudinal dimension of the outer pipe. An advantage of the drain tile securing device o the present invention is that the inner and out pipe configurations and dimensions allow a person to initially slide the drain tile upon the inner pipe, whereupon the drain tile is readily slid between the inner and outer pipes until engaging a corresponding wall of the pipe flange.

Another object of the present invention is to provide a drain tile securing device having a manually operated latching member that low in cost and requires a relatively small amount of manpower. A feature of the device is a latch subassembly welded or otherwise proximately secured to a first end of an aperture or rod receiving slot in the outer pipe, the latch subassembly including a manually operated handle and a rod connector assembly. Another feature of the device is a pivot mount assembly or member proximately secured to a second end of the aperture or groove in the outer pipe. Still another feature of the device is an arcuate securing rod having a first end pivotally secured to the rod connector assembly and having a second end pivotally secured to the pivot mount member. An advantage of the device is that when the latch subassembly is manually disposed in an unlatched position, the arcuate securing rod is disengaged from a drain tile disposed upon the inner pipe and proximate to the rod receiving slot in the outer pipe. Another advantage of the device is that when the latch subassembly is manually disposed in a latched position, the arcuate securing rod is disposed between adjacent ribs of the drain tile and the securing rod is forcibly engaged with the drain tile disposed upon the inner pipe and proximate to the rod receiving slot in the outer pipe, resulting in the securing rod maintaining the position of the drain tile upon the inner pipe; thereby allowing a vacuum truck to forcibly remove a liquid or slurry from drain sewers when the location of the vacuum truck is to distal to the drain sewer, the drain tile securing device providing a more readily adaptable extension of the operating range of the vacuum truck by permitting a releasable connection.

Briefly, the invention provides a securing device having a flange configured for mounting on a suction-providing source;

an outer pipe integrally joined to and extending outwardly from the flange, the outer pipe having a rod receiving slot extending radially about a portion of the outer pipe, the slot having a pivot end and a latch end;

an inner pipe integrally joined to and extending outwardly from the flange such that the inner pipe is in fluid engagement with the suction-providing source when said flange is securely mounted to the suction-providing source;

an annulus defined by the space between an inner wall of the outer pipe and an outer wall of the inner pipe, said annulus ultimately receiving an end portion of a corrugated pipe, the inner pipe being dimensioned to receive the end portion of the corrugated pipe such that the end portion can be simultaneously positioned within the outer pipe and over said inner pipe;

a latch subassembly mounted on said outer pipe and positioned proximate to the slot latch end, the latch subassembly configured to be movable between a latched position and an unlatched position;

a securing rod having a latching end and a pivoting end, the rod being pivotally connected to the rod connector assembly proximate to the slot pivot end, the rod being operatively associated with the latch subassembly so as to be movable from a latched position to an unlatched position; whereby, when the latch subassembly is in the unlatched position, the rod is in a released position, and when the latch subassembly is in the latched position, the rod is in a secured position.

The invention further provides a method for transporting a vacuumed liquid to a suction source, the method including the steps of:

providing a flange having a central aperture;

securing an inner pipe to the flange, said inner pipe having a predetermined longitudinal dimension and diameter, the inner pipe being concentrically disposed about said central aperture of the flange;

securing an outer pipe to the flange, the outer pipe having a predetermined longitudinal dimension and a diameter relatively larger than the diameter of the inner pipe, the outer pipe being concentrically disposed about the inner pipe, thereby forming an annulus between the inner and outer pipes for ultimately receiving an end portion of a drain tile;

providing a slot in the outer pipe;

securing a latch subassembly to an outer wall of the outer pipe proximate to a slot;

securing one end of a rod connector assembly to a latch subassembly, and securing an opposite end of the rod connector assembly to a latch receiving end of a securing rod; and securing a pivot end of the securing rod to a pivot mount assembly, whereby, the latch subassembly is initially disposed in an open or unlatched position, resulting in the securing rod being disposed outside the outer wall of the outer pipe in a released position to promote the insertion of an end portion of a drain tile into the annulus, whereupon, the latch subassembly is disposed in a closed or latched position, resulting in the securing rod being disposed in a secured position in a cooperating recess of the drain tile to urge the drain tile into engagement with the inner pipe, thereby maintaining the proximate position of the drain tile relative to the inner and outer pipes, irrespective of the liquid flow volume through the drain tile and into the inner pipe then ultimately into a vacuum truck.

The invention also provides a method for constructing a conduit securing device that connects a conduit to a vacuum truck to increase the distance a vacuum truck can engage and remove a liquid volume, the method including the steps of:

providing a flange having a central aperture, said flange ultimately being secured to the vacuum truck;

securing an inner pipe to the flange, the inner pipe having a predetermined longitudinal dimension and diameter, the inner pipe being concentrically disposed about the central aperture of the flange;

securing an outer pipe to the flange, the outer pipe having a predetermined longitudinal dimension and a diameter relatively larger than the diameter of the inner pipe, the outer pipe being concentrically disposed about the inner pipe, thereby forming an annulus between the inner and outer pipes for ultimately receiving an end portion of a drain tile;

providing a slot in the outer pipe;

disposing a strap member about a conduit inserted into the annulus;

connecting the strap member to a strap wrench after routing first and second end portions of the strap member through the slot after disposing the strap member about the conduit; and tightening the strap member about the conduit via the strap wrench, whereby the position of the conduit is maintained relative to the inner pipe via the strap wrench being locked to maintain the strap member in a tightened position about the conduit, whereupon, irrespective of the liquid flow volume through the conduit and into and out of the inner pipe, the conduit securing device maintains liquid flow continuity between a suction end of the conduit disposed in the liquid volume and the vacuum truck.

BRIEF DESCRIPTION OF THE DRAWINGS

The foregoing invention and its advantages may be readily appreciated from the following detailed description of the preferred embodiment, when read in conjunction with the accompanying drawings in which.

DETAILED DESCRIPTION OF THE PREFERRED EMBODIMENTS

Figure 1:
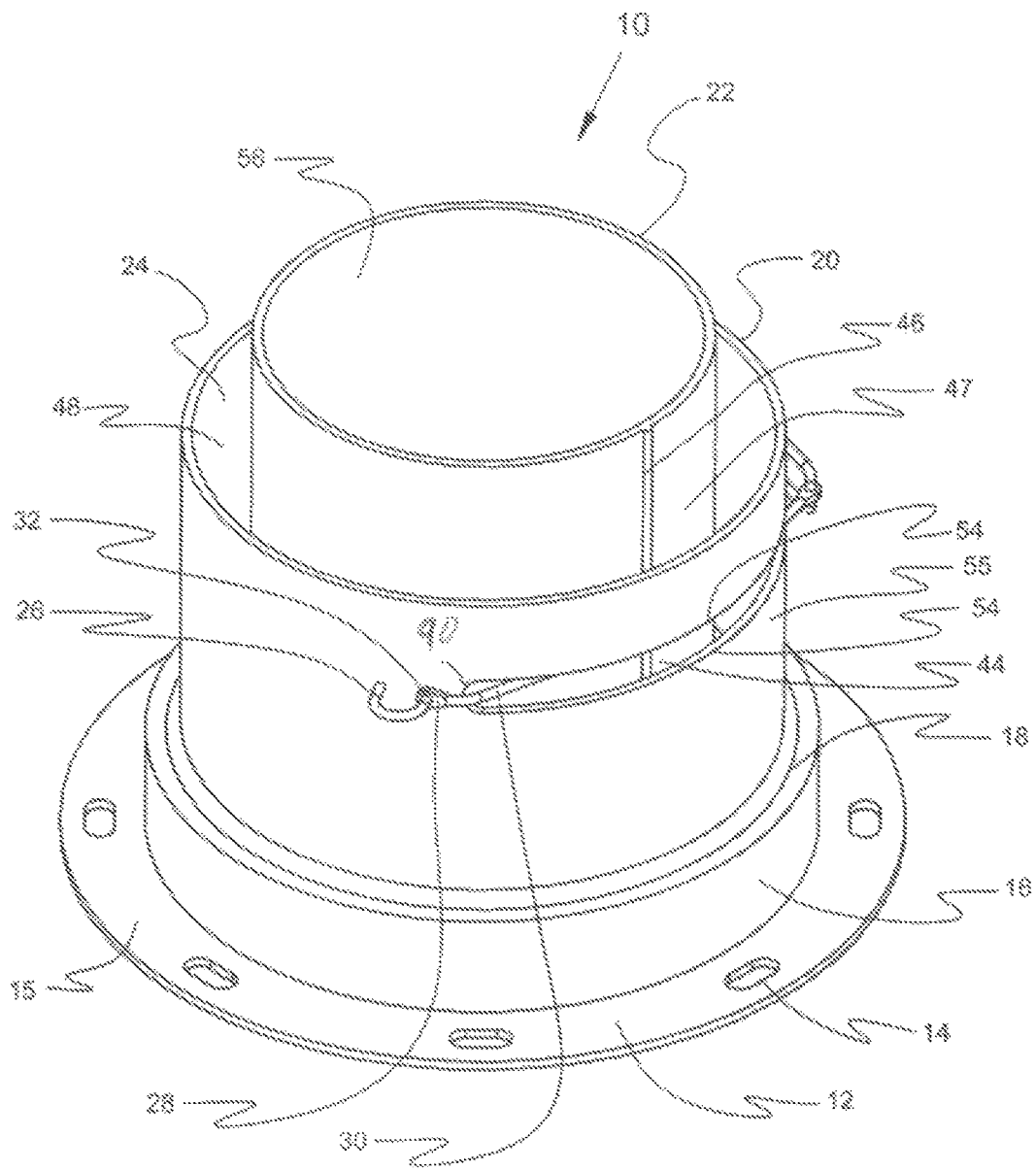
FIG. 1 is a top-side plan perspective view of a drain tile securing device depicting a portion of the securing mechanism in a secured or closed position in accordance with the present invention.

Referring now to FIGS. 1 through 8, a preferred embodiment of a drain tile securing device in accordance with the present invention is depicted as numeral 10. The drain tile securing device 10 is fabricated from carbon steel, rigid plastic such as PVC, or aluminum with stainless steel being the preferred material of manufacture. The components used to construct the device 10 are all well known to those of ordinary skill in the art. Preferred components are a toggle clamp (represented by numbers 40 and 42 in FIGS. 1-8, infra) sold by the Toggle Clamp Store off the Internet, the toggle clamp having part number LT-431; and a flat flange (represented by number 12 in FIGS. 1-8, infra) sold by EPA environmental products and accessories of the internet, the flange having part number VTR-8HF.

The drain tile securing device 10 detachably receives a drain tile 4 (not part of the present invention) having a plurality of circumferentially and radially disposed ribs 6 separated by circumferentially and radially disposed recesses 8. The ribs 6 and recesses 8 have substantially the same axial or transverse dimension, which is relatively small when compared to the inner (or outer) diameters of the ribs 6 and recesses 8, the ribs 6 having a slightly larger diameter than a corresponding inner our outer diameter of the recesses 8. The configurations and dimensions of the ribs 6 and recesses 8 cooperate to allow a relatively rigid drain tile 4 fabricated from plastic such as PVC or similar materials to bend or otherwise curve to promote the connection of one end of the drain tile 4 to the securing device 10 and to allow an opposite end of the drain tile 4 to be disposed in a liquid, fluid and/or slurry material to be vacuumed or otherwise "sucked" into a vacuum truck (not depicted).

Figure 7:
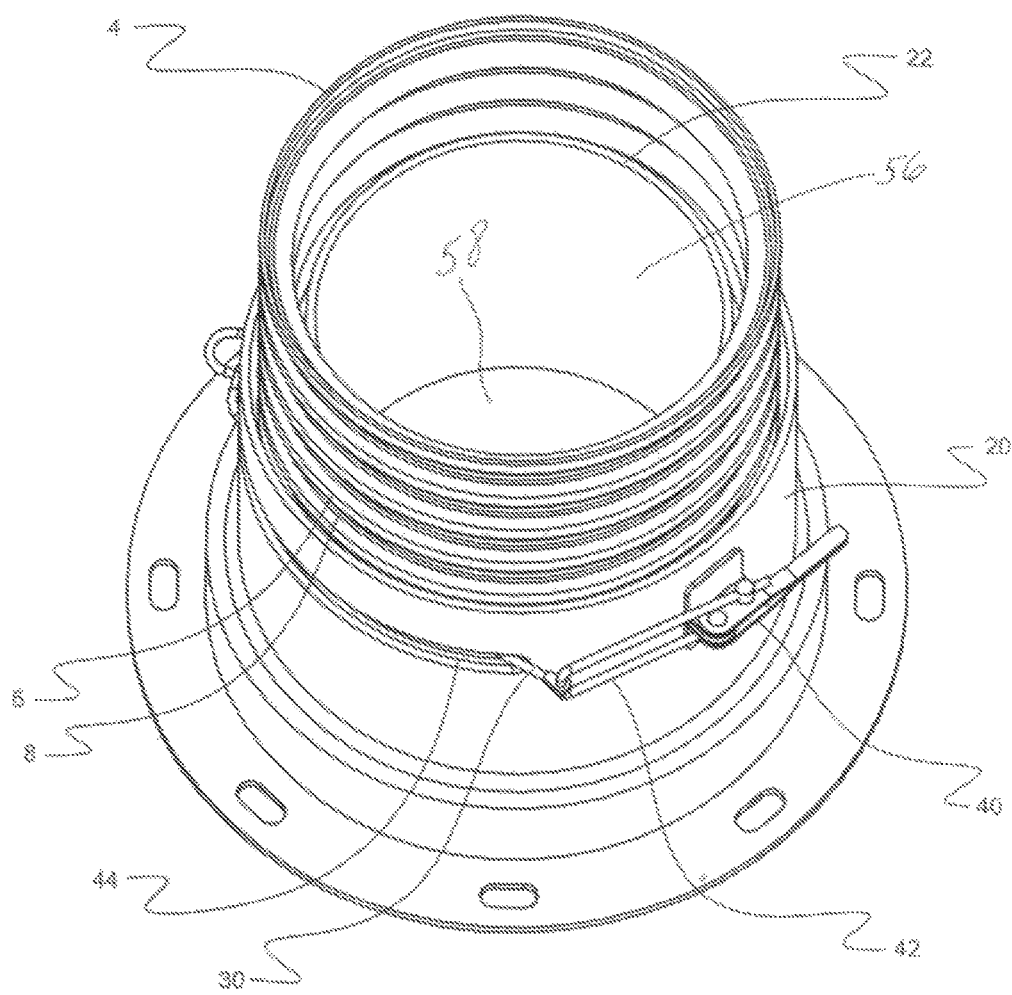
FIG. 7 is a top-side plan perspective view of a drain tile securing device and a drain tile inserted inside the outer pipe, and the securing mechanism in a closed position in accordance with the present invention.
Figure 8:
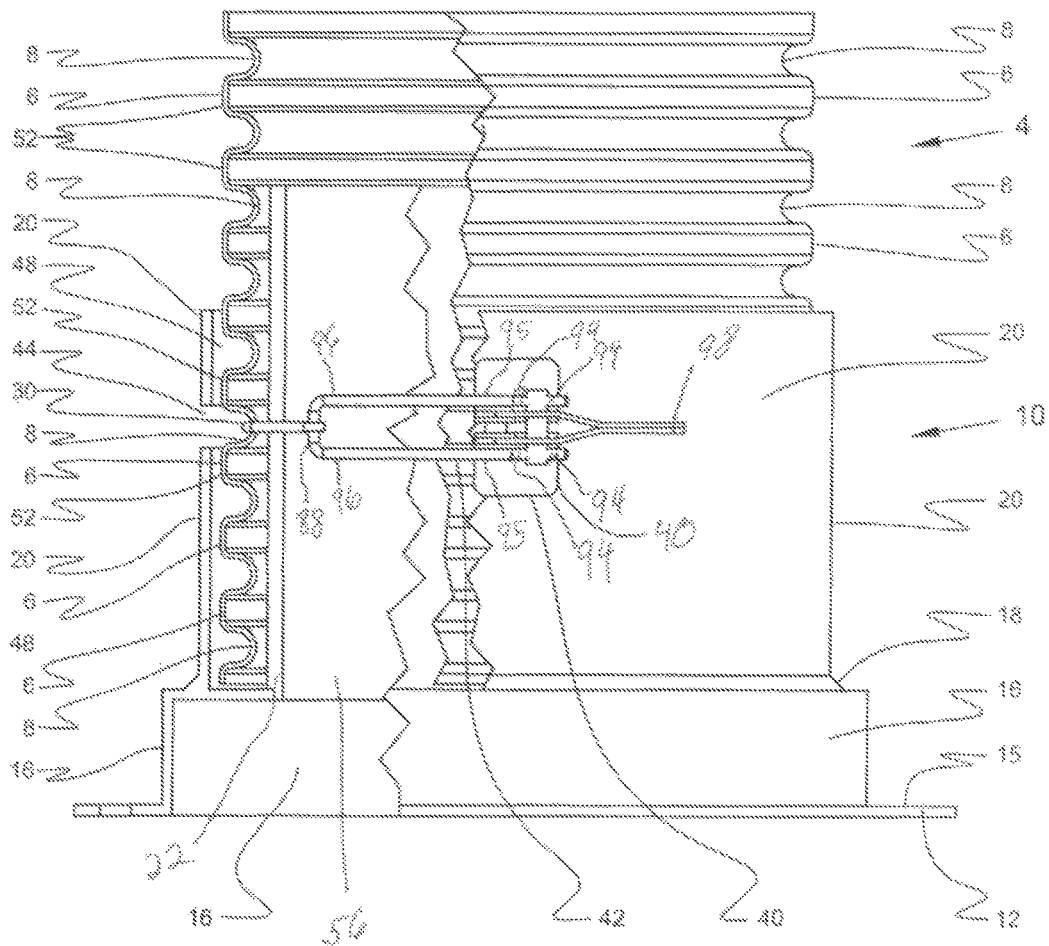
FIG. 8 is a front elevation view of a drain tile securing device, but with a cut-away view depicting engagement between a rod member and a drain tile inserted in an outer pipe in accordance with the present invention.
Figure 9:
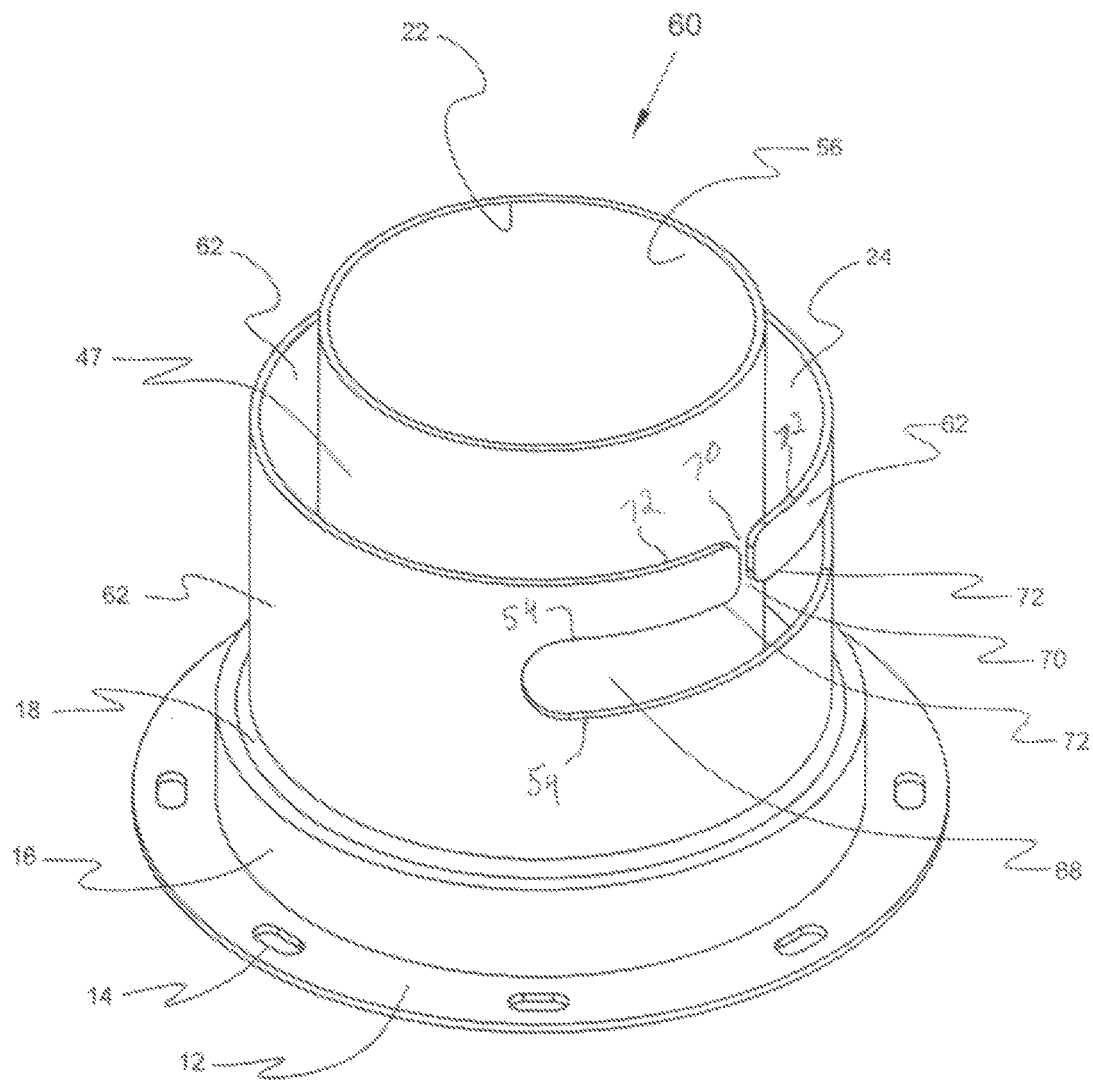
FIG. 9 is a top-side plan perspective view of an alternative embodiment for the outer pipe that includes a configuration adapted to receive a strap wrench (not depicted) in accordance with the present invention.

Referring to FIGS. 1, 7 and 8, the drain tile securing device 10 includes a flange 12 having a central aperture 13 (FIG. 5), the flange 12 configured for mounting on a suction source, such as a vacuum truck (not depicted), and secured by bolts (not depicted) that pass through holes or apertures 14 disposed through the flange 12. As an alternative to bolts, clamps or similar securing devices well known to those or ordinary skill in the art may be used for securing the drain tile securing device 10 to a vacuum truck. A lift extension 16 is integrally secured via a longitudinal edge portion to an inner wall 15 of the flange 12. The lift extension 16 extends perpendicularly and circumferentially from the inner wall 15 in an axially aligned relationship with the flange 12.

The lift extension 16 is a circular offset formed from a relatively "thin" strip of metal having longitudinal and lateral dimensions that form an annulus with a relatively large diameter and relatively small axial dimension to provide sufficient working space for welding a shoulder 18 upon an annular edge portion of the lift extension 16 distal to the inner wall 15 of the flange 12. The shoulder 18 extends radially inward toward a central longitudinal axis of said shoulder a distance sufficient to support, circumferentially receive and secure both a cylindrical outer or major pipe 20 and a concentric, inner or minor pipe 22 upon a top wall of the shoulder 18, thereby separating the bottom of the outer and inner pipes 20 and 22 from the top wall 15 of the flange 12 a distance equal to the lateral dimension of the strip of metal that forms the lift extension 16. The longitudinal axial dimension of the inner pipe 22 is relatively longer than the longitudinal axial dimension of the outer pipe 20. Further, the diameter of an outer cylindrical wall 26 of the inner pipe 22 is slightly smaller than the drain tile 4 inner diameter formed via the inner cylindrical walls of the recesses 8. The longitudinal or axial dimension and the diameter of the outer wall 47 of the inner pipe 22 cooperate to allow a person to initially slide the drain tile 4 upon the inner pipe 22 with minimal manual force. The diameter of an inner wall 56 of the inner pipe 22 is substantially equal to the diameter of a central aperture 58 in the shoulder 18, thereby promoting the integrally joining of congruent edges 59 of the inner wall 56 and central aperture 58 in the shoulder 18 to provide an orifice without circumferential obstructions that would otherwise restrict liquid flow from the shoulder aperture 58 into the inner pipe 22, the liquid ultimately flowing into and through the drain tile 4 and into the vacuum truck.

The radial distance between an outer wall 47 of the inner pipe 22 and an inner wall 48 of the outer pipe 20 forms an annular space or drain pipe 4 receiving annulus 24 dimensioned to receive a drain 4 without obstruction until an end portion of the drain tile 4 engages the shoulder 18, which is integrally joined to respective ends of the outer and inner pipes 20 and 22. The radial distance of the annulus 24 is slightly larger than the drain tile wall thickness defined by the radial distance from an inner wall surface 50 of a recess 8 of the drain tile 4 to a "rounded" apex 52 of an adjacent rib 6 of the drain tile 4. The larger radial dimension of the annulus 24 relative to the radial "thickness" of the drain tile 4 prevents engagement between the ribs 6 of the drain tile 4 and the inner wall 28 of the outer pipe 20 as the drain tile 4 is being manually urged upon inner pipe 22 until the drain tile 4 engages the inner wall 15 of the flange 12.

Referring to FIGS. 1-8, a pivot mount assembly 26 is provided on an outer wall 55 of the outer pipe 20 and configured to provide pivotal connection with pivot end 28 of securing rod 30. A pivot aperture 32 is provided in the pivot end 28 of the securing rod 30 and is operatively associated with the pivot mount assembly 26 to provide the pivotal connection of the securing rod 30 to the outer pipe 20. A rod receiving slot or aperture 44 is provided in the outer pipe 20 and is out to extend circumferentially about the outer pipe 20. The slot 44 includes a lateral dimension defined by the distance separating substantially parallel opposing edges 54. The slot 44 includes a circumferential distance that allows the securing rod 30 to be inserted into the slot 44 without engaging a slot pivot end 90 or a slot latch end 92. The opposing edges 54 are separated a distance ranging between one-half and one inch with the preferred separation distance being substantially about three-fourths of an inch. The edges 54, and pivot end 90 and latch end 92 cooperate to provide a slot 44 sufficiently sized to allow the securing rod 30 to longitudinally insert into the slot 44 without engaging the pivot and latch ends 90 and 92. However, the securing rod 30 may engage one of the edges 54 during the longitudinal insertion of the rod 30 into the slot 44 due the allowed axial movement (relative to the outer pipe 20) of the rod upon the rod connector assembly 42 and the pivot mount assembly 26. The securing rod 30 is ultimately urged into the slot via movement of the latch subassembly 40 to a latched position, whereupon, the rod 30 is forcibly disposed into a cooperating recess 8 of the drain tile 4.

It is believed that the slot 44 could extend from substantially about ten degree to one hundred and twenty degrees about the circumference of the outer pipe 20. More preferably, the slot 44 would be configured to extend from thirty degrees to ninety degrees around the circumference of the outer pipe 20. As shown and most preferably, the slot 44 extends approximately sixty degrees about the circumference of the outer pipe 20. The securing rod 30 is moveable between a secured position shown in FIGS. 1, 2, 7 and 8, and a released position shown in FIGS. 3-6. In the secured position of FIGS. 1, 2, 7 and 8, the rod 30 is inserted within a portion of the slot 44 and into engagement within a recess 8 and between adjacent ribs 6 of the drain tile 4.

The rod 30 includes a latch-receiving end 34 provided with a latch aperture 38. A latch subassembly 40, movable between a latched position and a fully unlatched position, is mounted on the exterior surface of the outer pipe 20 via welding or similar securing techniques well known to those of ordinary skill. The latch subassembly 40 has a rod connector assembly 42 that cooperates with the rod latch aperture 38 so as to secure the rod 30 to the latch subassembly 40 in movable relation. The latch subassembly 40 is operatively associated with the securing rod 30 such that when the latch subassembly 40 is in the fully unlatched position, the securing rod 30 is in the released position, and when the latch subassembly 40 is in the latched position, the rod 30 is in the secured position. Thus, movement of the latch subassembly 40 moves the rod 30 between the released position shown in FIGS. 3-6, and the secured position shown in FIGS. 1, 2, 7 and 8.

Figure 2:
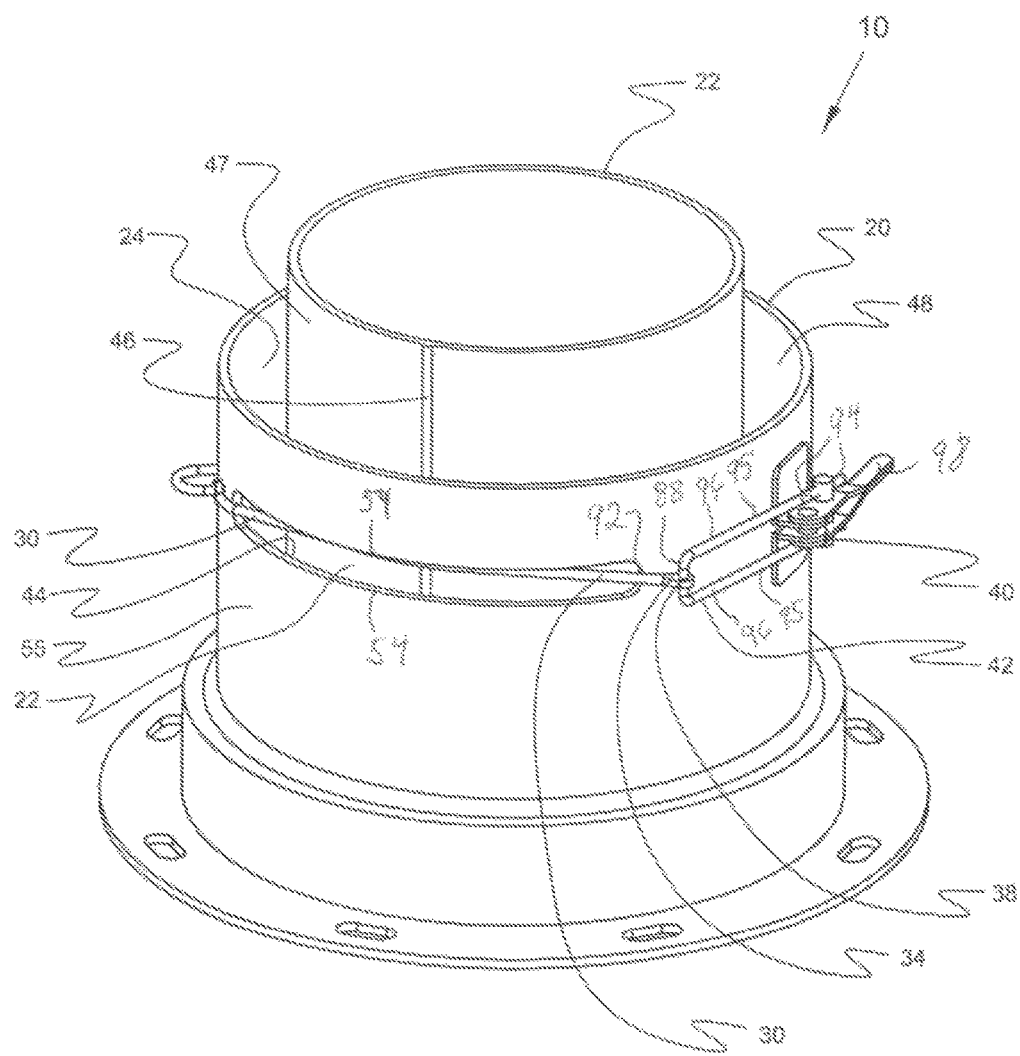
FIG. 2 is a top-side plan perspective view of a drain tile securing device depicting the securing mechanism in a closed position.
Figure 3:
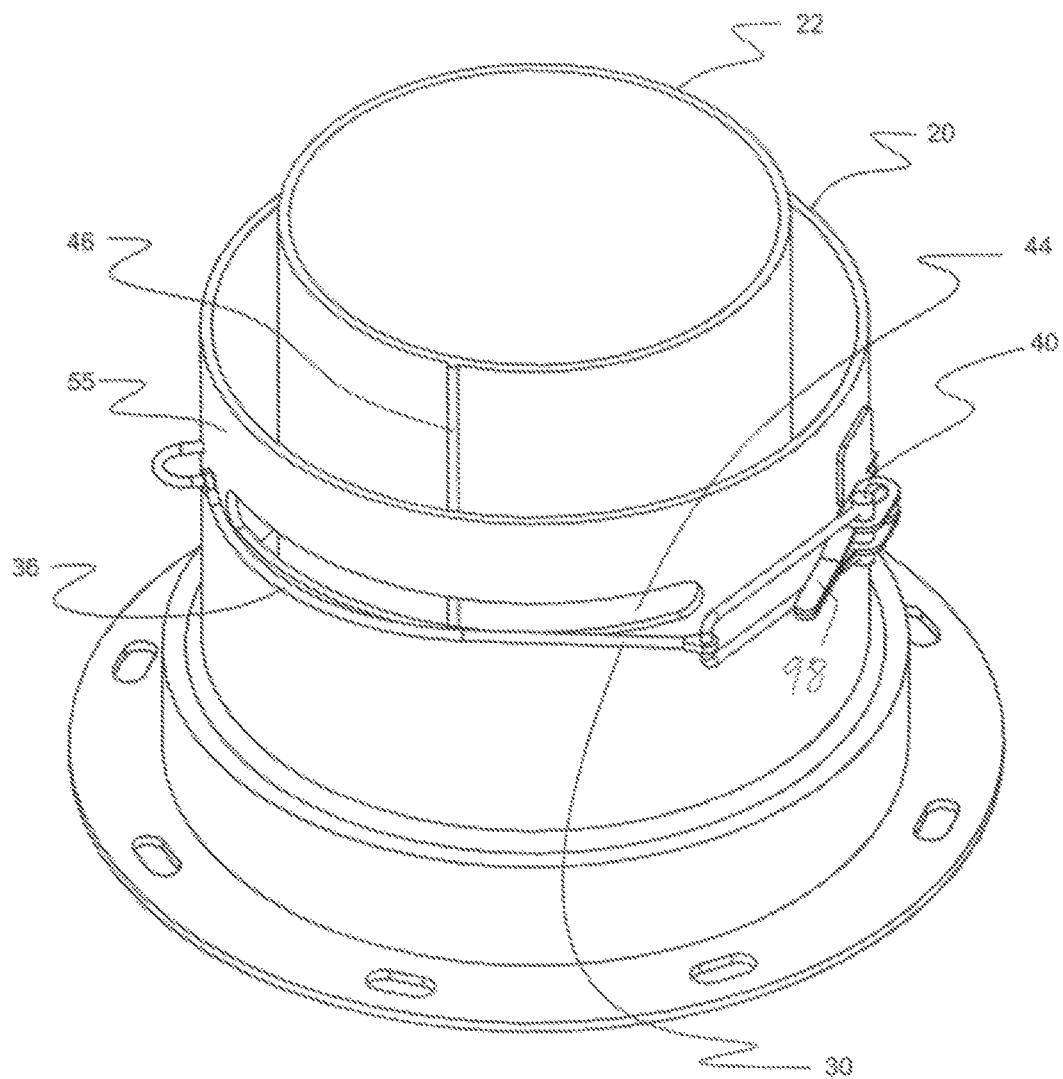
FIG. 3 is a top-side plan perspective view of a drain tile securing device depicting the securing mechanism in an open or released position in accordance with the present invention.
Figure 4:
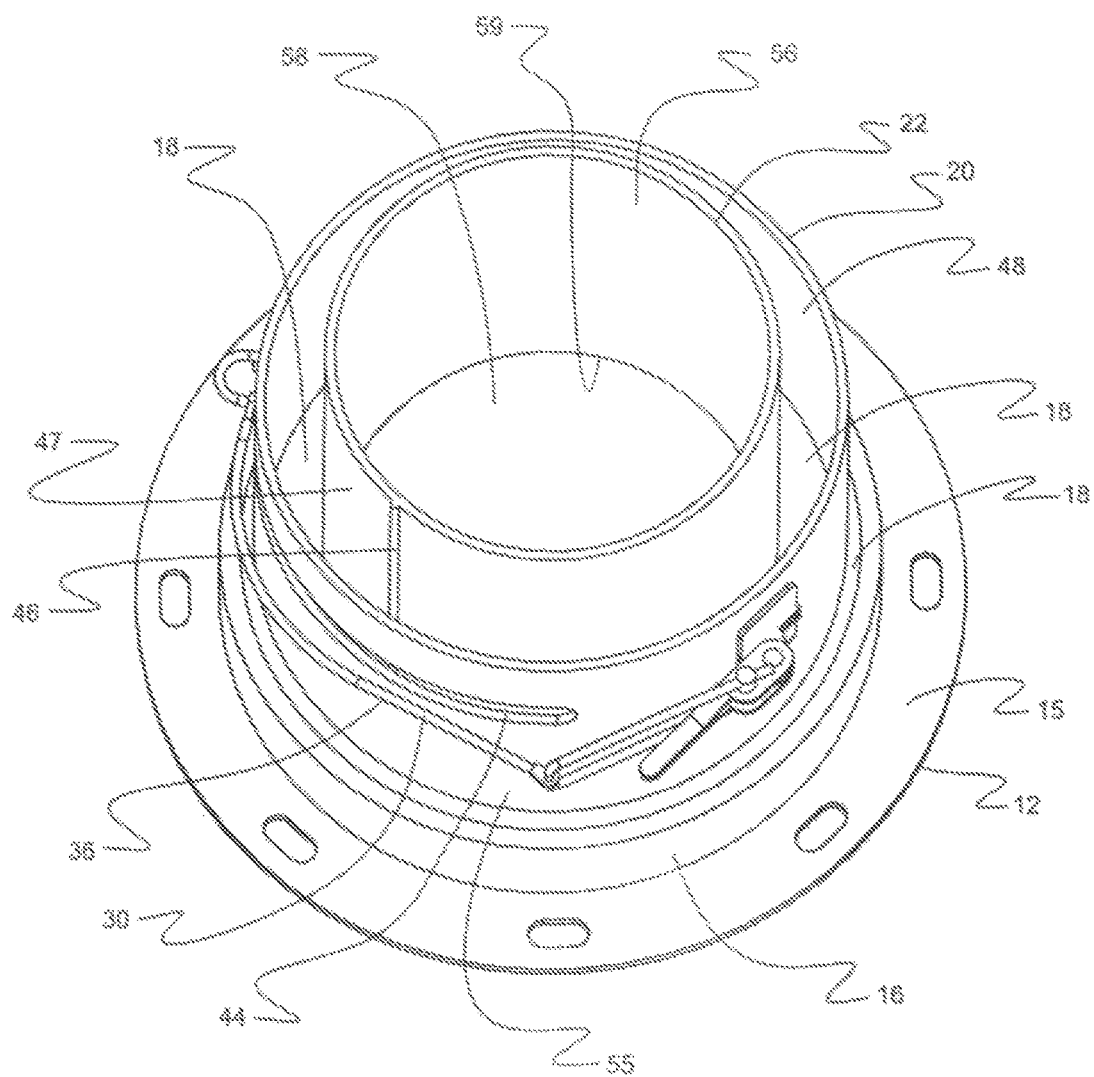
FIG. 4 is a top plan perspective view of a drain tile securing device depicting the securing mechanism in an open position.
Figure 5:
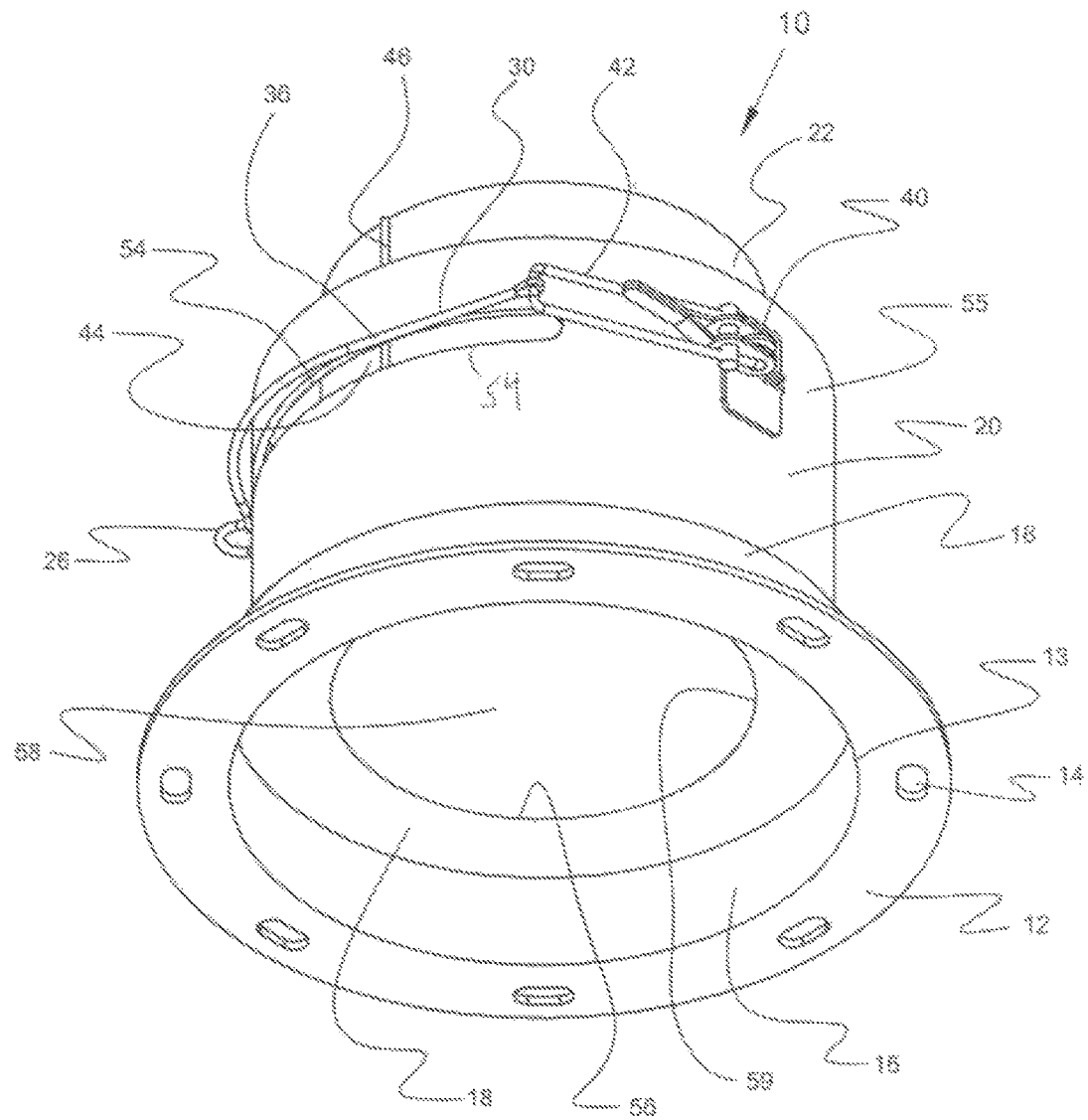
FIG. 5 is a bottom-side plan perspective view of a drain tile securing device depicting the securing mechanism in an open position.

FIGS. 2-4 depict the centrally disposed securing region 36 of the rod 30, which is positioned proximate to the outer wall 47 of the inner pipe 22 when the securing rod 30 is in the secured position. It is not necessary to have the securing region 36 of the rod 30 actually make contact with the inner pipe 22 to secure the drain tile 4 to the outer pipe 22. Instead, the securing rod 30 secures the drain tile 4 to the inner pipe 22 when the securing region 36 is disposed in the slot 44 in the secured position and the securing region 36 forcibly urges a cooperating portion of a recess 8 of the drain pipe 4 against the outer wall 46 of the inner pipe 22, thereby minimizing the longitudinal or axial movement of the drain tile 4 upon the inner pipe 22 via edges 54 of the slot 44 engaging cooperating portions of the securing rod 30 in the event of axial movement of the drain tile 4 upon the inner pipe 22. Further, the securing or "grasping" feature of the securing region 36 of the rod 30 is increased via a curved or arucate configuration with dimensions that cooperate with the outer diameter of a recess 8 that receives the securing region 36 to promote continuous radial engagement between the securing region 36 and recess 8. The securing feature of the rod 30 is further increased by selecting a rod 30 with a substantially cylindrical configuration that includes a diameter dimensioned to "fill" a relatively large portion of a respective recess 8 that receives the rod 30 when the latch subassembly 40 is disposed in a closed position. The arcuate configuration and diameter of the securing region 36 cooperate to stabilizing and maintain the position of the drain tile 4 upon the inner pipe 22 in the event of a liquid flow urging the drain tile 4 in an axial direction upon the inner pipe 22. As shown in FIGS. 3-6, when the securing rod 30 is in the released position, the securing region 36 of the rod 30 is moved distally from the inner pipe 22 such that the rod 30 including the securing region 36 is disposed external to an outer wall 55 of the outer pipe 20.

While the securing rod 30 is depicted with a round configuration, it is understood that the rod 30 need not be so shaped. Additionally, while the rod 30 is generally straight along its length, it could be arcuate along its length, thereby permitting a greater relative engagement region with the recess 8 that receives the rod 30, resulting in more securing force being imparted upon a larger area of the drain tile 4 to ultimately maintain the drain tile 4 upon the inner pipe 22. The preferred radius of curvature of the rod 30 would be equal to the radius of curvature of the recess 8 that receives the rod 30, thereby maximizing the surface area of the drain tile 4 that receives a holding force generated by the rod 30, resulting in the minimization of axial movement of the drain tile 4 upon the inner pipe 22, and a corresponding reduction of liquid escaping from the drain tile 4 along portions of the drain tile 4-inner pipe 22 periphery that does not receive a holding force from the securing rod 30. Further, the rod 30 may be replaced by a cable or similar flexible member with the substantially the same tensile strength.

Figure 6:
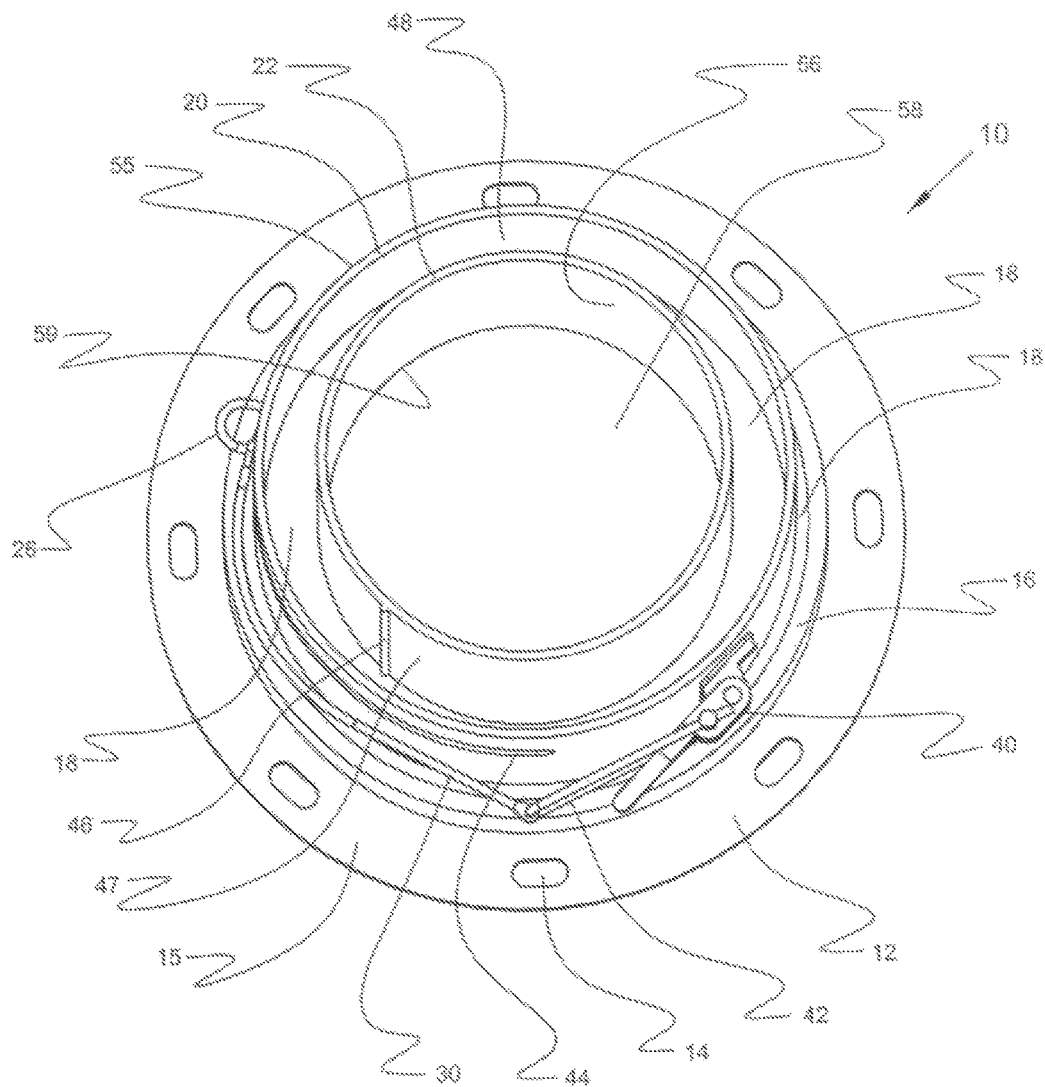
FIG. 6 is a top plan perspective view of a drain tile securing device depicting the securing mechanism in an open position and depicting the entire flange with inner and outer pipes secured thereto.
Figure 6A:
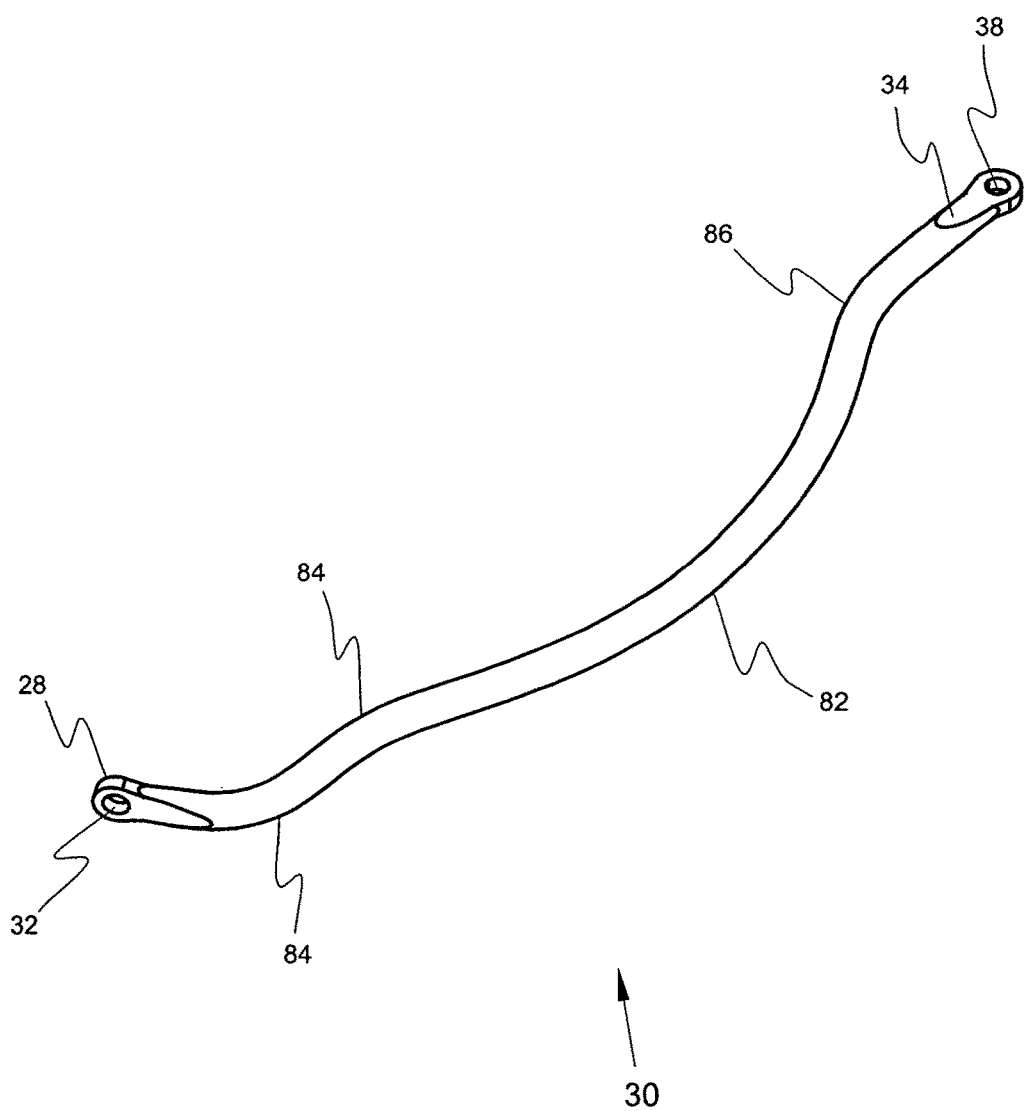
FIG. 6A is a top elevation view of a preferred embodiment of a securing rod in accordance with the present invention.

The preferred configuration for the securing rod 30 is depicted in the top elevation view of FIG. 6A. The preferred securing rod 30 configuration includes a pivot end 28 with pivot aperture 32, a latch receiving end 34 with rod latch aperture 38, an arcuate or curved pipe engagement midportion 82, and first and second off-set portions 84 and 86 that enable the mid-portion 82 to engage the drain tile 4 inside the outer pipe 20 with the latch subassembly 40 in a latched position outside the outer pipe 20. The preferred securing rod 30 is substantially cylindrical with a diameter sized to completely "fill" a respective recess 8 of a drain tile 4 that receives the rod 30 after the latch subassembly 40 is disposed in a latched position. The preferred securing rod 30 includes planar vertical side walls (when the flange 12 is horizontally positioned) forming the pivot end 28 and planar horizontal side walls forming the latch receiving end 34. The vertical side walls of the pivot end 28 position the pivot aperture 32 to receive and slide upon the "horseshoe" shaped pivot mount assembly 26 horizontally disposed proximate to the slot pivot end 90. The horizontal side walls of the latch receiving end 34 position the rod latch aperture 38 to receive and slide upon a lateral portion 88 of the rod connector assembly 42.

The first offset portion 84 is a lineal section that cooperates with the pivot end 28 to form a relatively "V" shaped configuration with predetermined dimensions that results in the arcuate mid-portion 82 being positioned in radial engagement with the cylindrical outer wall 47 of the inner pipe 22 when the latch subassembly 40 is in a latched position and the drain tile 4 is not disposed in the annulus 24. The second offset portion 86 is a bend in the securing rod 30 that results in the latch receiving end 34 being disposed outside the outer wall 55 of the outer pipe 20 and proximate to a slot latch end 92 to promote the connection of the receiving end 34 with the rod connector assembly 42. The positioning of the latch receiving end 34 outside the outer wall 55 also results in a bending of the latch receiving end 34 as a latched position is approached by the latch subassembly 40, and after the arucate mid-portion totally engages the outer wall 47 of the inner pipe 22, resulting in a bias being generated by the mid-portion upon a drain pipe 4 disposed in the annulus 24 that maintains the drain pipe 4 upon the inner pipe 22, irrespective of the flow volume through the drain pipe 4.

The generated bias by the mid-portion 82 upon the drain pipe 4 by the latch subassembly 40 disposed in a latched position, can be manually adjusted to greater or lesser amounts of force via adjusting the position of four nuts 94 disposed upon threaded portions 95 of two longitudinal portions 96 of the latch subassembly 40. Tightening the four nuts 94 upon the threaded portions 95 of both longitudinal portions 96, results in the handle 98 of the latch subassembly 40 being drawn toward the latch receiving end 34 of the securing rod 30, thereby requiring the handle 98 to travel a greater distance before the handle 98 can be placed in a latched position. The less the distance between the handle 98 and the latch receiving end 34, the greater the distance the handle 98 must travel before obtaining a latched position; and the greater the bending force imparted upon the latch receiving end 34, resulting in more force being generated by the securing rod 30 upon the drain tile 4.

As constructed, the outer pipe 20 has an inner diameter of substantially about 7.25 inches. The inner pipe 22 has and outer diameter of substantially about 6 inches. A weld 46 is depicted in the inner pipe 22, which had been cut axially and welded back together with an outward taper, thereby rendering the inner pipe 22 slightly conical in taper along its length, to facilitate easier installation of the drain tile 4 or an alternative hose or conduit upon the inner pipe 22. The conical feature also facilitate the creation of a gentle seal between the drain tile 4 or hoe and the inner pipe 22, and further limits axial movement of the drain tile 4 or hose relative to the inner pipe 22.

As depicted, the preferred embodiment of the present invention is configured to retain corrugated plastic drain tile within the device 10, without the aid of tape or any other additional material or hardware. The preferred embodiment of the present invention uses an 8-inch flange. A 1-inch sheet metal ring having an 8-inch outer diameter and a 6-inch inner diameter is welded to the flange, creating a reduction from 8-inch to 6-inch diameter.

Next, a section of 6-inch, 10 gauge tube is aligned with the inner 6-inch orifice and welded in that position to form the inner pipe 22. Optionally, the inner pipe 22 may be either sliced or pied and welded together to create a slight taper. In the example depicted, the inner pipe is 6 inches on the end secured to the shoulder and approximately 5.8 inches on the distal end. Alternatively, the taper could result in a relatively larger proximal end of substantially about 6.2 inches, with the same 5.8-inch diameter on the distal end. The taper reduces friction and correspondingly reduces the manual force required to slide the drain tile 4 over the inner pipe 22, and facilitates a better seal between the drain tile 4 or hose and the inner pipe 22.

A tube with substantially about a 7.25-inch inner diameter is then centered about the smaller, 6-inch tube, and is welded to the flange to create the outer pipe 20. This creates an annular space of approximately ⅝ inch between the outer pipe 20 and the inner pipe 22 to accommodate the drain tile 4. The annular space defined must be greater than the thickness of the drain tile 4 or hose to be secured to the inner pipe 22.

The outer pipe 20 is provided with a 4-inch long, ½-inch wide, circumferential groove configured to accept a ⅜-inch rod 30. The rod 30 is solid and generally cylindrical, with each end flattened, and provided with apertures through each end of the rod 30. The rod 30 is anchored near a first end of the slot 44 via a half of a chain link (the pivot mount assembly 26) allowing the rod 30 to move freely. The opposite end of the rod 30 is attached to a small binder type clamp to secure the drain tile 4 within the device 10.

Preferably, the outer pipe 20 extends axially from the flange 12 between 5 inches and 9 inches. More preferably, the outer pipe 20 extends axially from the flange 12 between 6 inches and 8 inches and most preferably, the outer pipe 20 extends axially from the flange 12, 7 inches. Preferably, the inner pipe 22 extends axially from the flange 12 between 6 inches and 10 inches. More preferably, the minor pipe 22 extends axially from the flange 12 between 7 inches and 9 inches and most preferably, the inner pipe 22 extends axially from the flange, 12, 8 inches.

In use, the device 10 is attached to a vacuum truck, combination sewer cleaning truck or hydro-excavating truck via a standard tube clamp, which is used on nearly all trucks of these types to connect one tube or hose to another. The majority of thee trucks have 8-inch flange hoses and tubes as standard equipment. The device has an 8 inch flange on the side that connects to the truck's hose or tube, and it receives 6-inch drain tile on the opposite side. Drain tile 4 can be slid into the device 10 by opening the latch clip to move the securing rod 30 into the released position. Then the latch clip is closed, which pulls the securing rod 30 into the securing position, which disposes the rod 30 in a recess 8 radially aligned with the rod 30. The disposition of the rod 30 into a recess 8 on the outside of a drain tile 4 or hose is a result of the corrugated contour of the drain tile or hose exterior, and applies lateral or radial pressure that pinches or sedges the drain tile 4 against the inner pipe 22. Removal is accomplished by releasing the lever of the latch subassembly 40, and sliding the drain tile 4 off the inner pipe 22 and out of the device 10.

Figure 15:
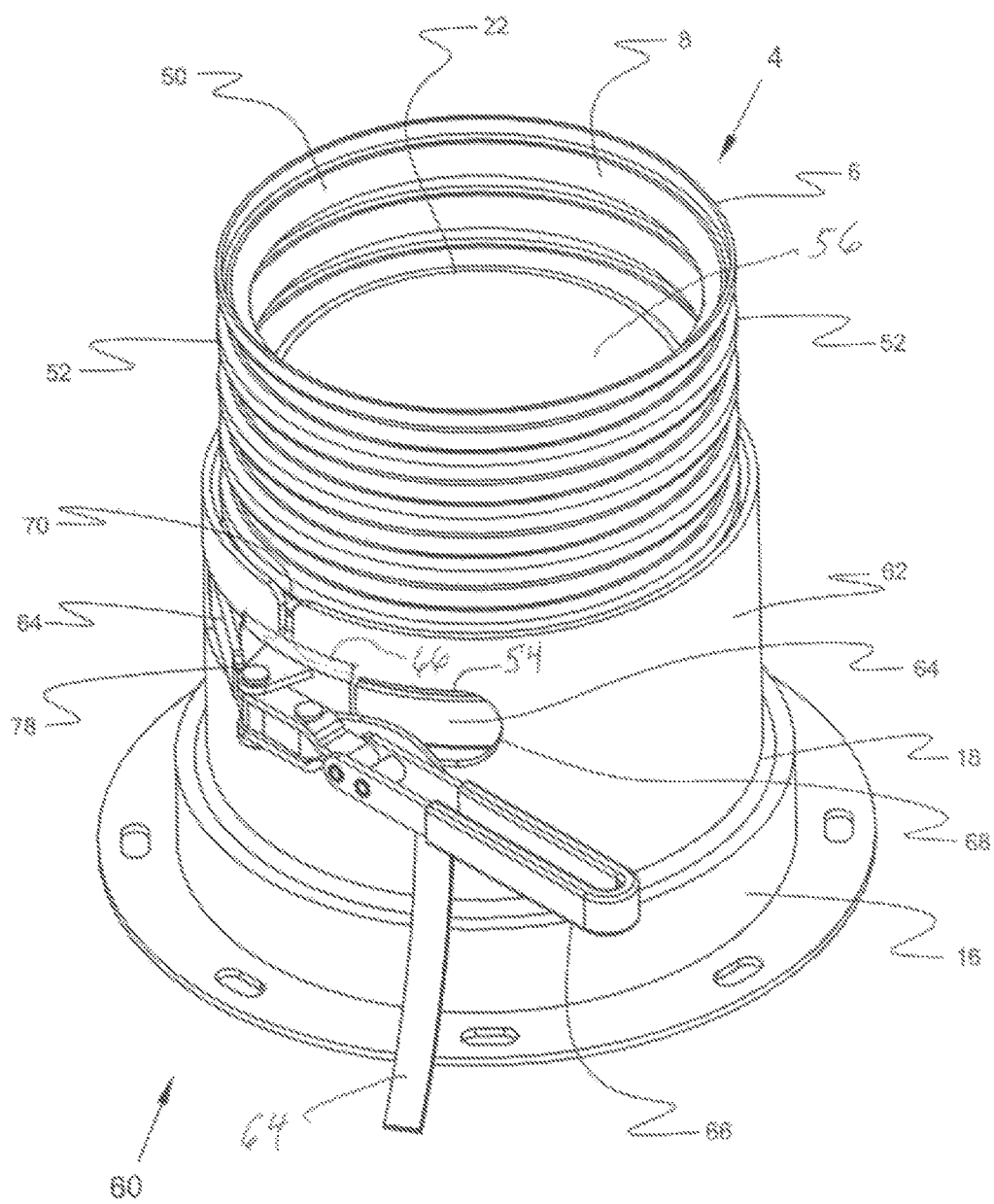
FIG. 15 is a top-side plan perspective view of an alternative pipe securing device and a drain tile inserted inside the outer pipe, and the strap wrench depicted in a tightened position in accordance with the present invention.
Figure 16:
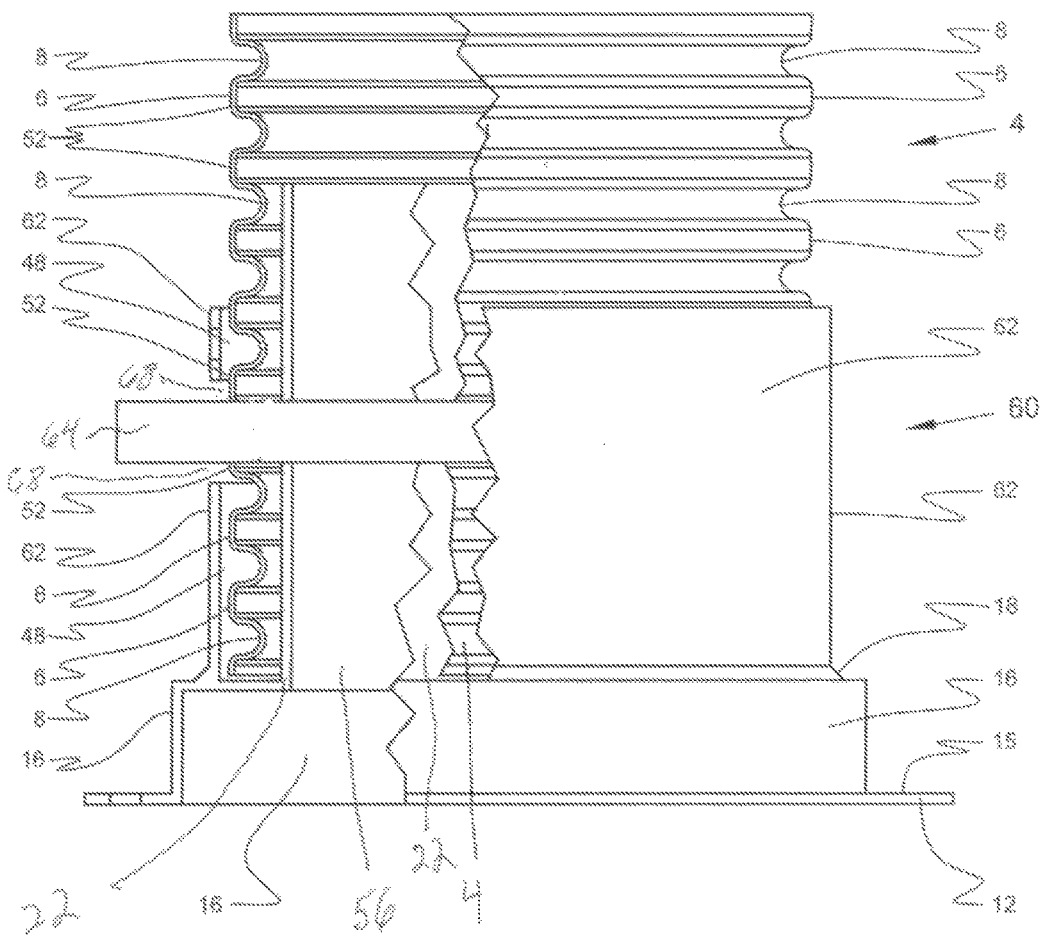
FIG. 16 is a front elevation cutaway view of an alternative securing device with a drain tile inserted in an outer pipe and a strap member protruding from a first slot.
Figure 17:
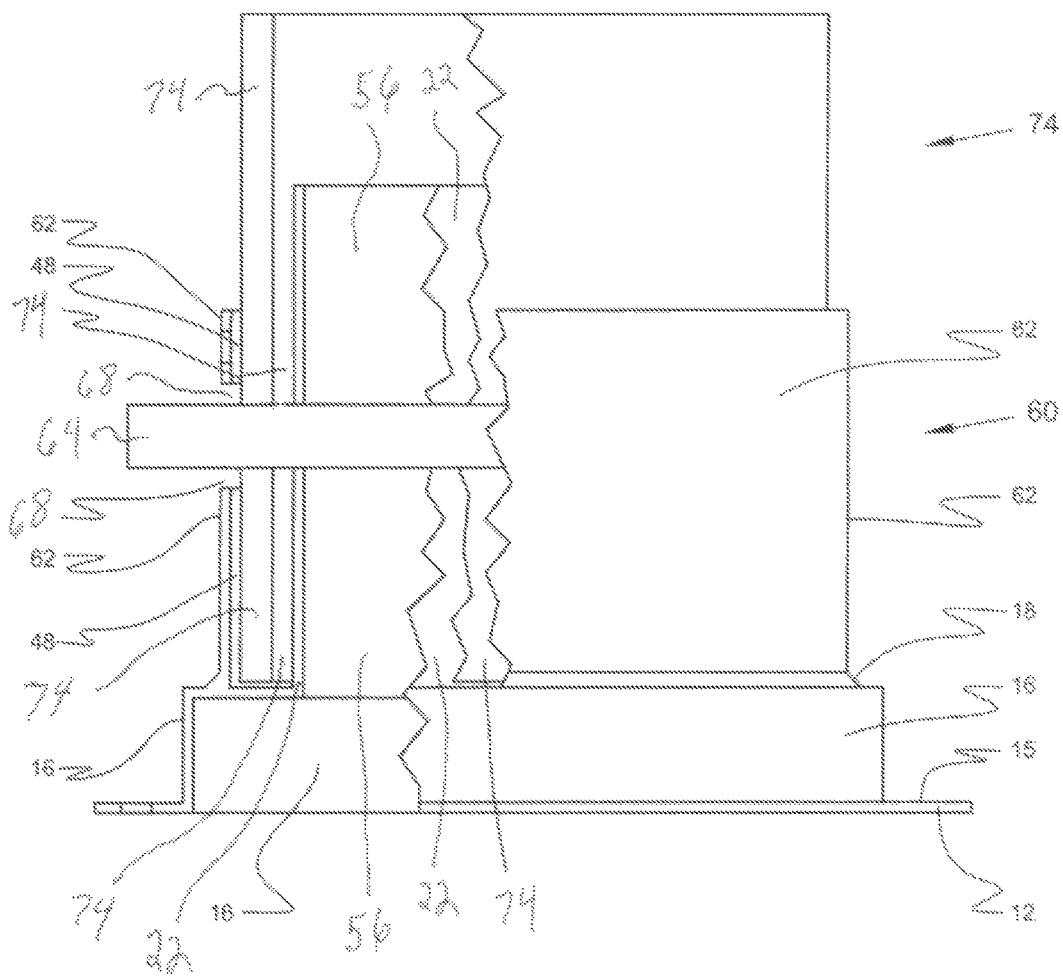
FIG. 17 is the front elevation view of FIG. 16, but with a conduit replacing the drain tile depicted in FIG. 16.

Referring now to FIGS. 9-17, an alternative embodiment is depicted for a conduit securing device in accordance with the present invention is denoted as numeral 60. The conduit securing device 10 includes an outer pipe 62 configured to receive a strap member 64 of a strap wrench 66. The strap wrench 64 is well known to those of ordinary skill and the preferred strap wrench 66 of the inventor is a Craftsman two piece sixteen inch rubber strap wrench set. Although the strap wrench 66 will maintain a corrugated drain pipe 4 in the conduit securing device 60 as depicted in FIGS. 10a-17, the primary purpose of the strap wrench 66 is to grasp a conduit 74 having a relatively smooth cylindrical outer wall and maintain the position of the conduit 74 between the inner and outer pipes 22 and 62 as depicted in FIG. 17, thereby enabling the connection of vacuum or relatively low positive pressure sources to the conduit 74.

The configuration of the outer pipe 62 includes a radially or circumferentially disposed first slot 68 having substantially the same configuration and dimensions as the slot 44 in the outer pipe 20 of the drain tile securing device 10. The outer pipe 62 further includes a second slot 70 extending from an upper edge 72 of the outer pipe 62 to the first slot 68, thereby providing relatively improved access for a strap member 64 to be disposed in the first slot 68 and connected to a strap wrench 66 after the strap member 64 is radially disposed circumferentially about a conduit 74 longitudinally inserted between concentric inner and outer pipes 22 and 62. The strap wrench 66 includes a locking mechanism that maintains a tightened position for the strap member 64 disposed about the conduit 74 after the strap member 64 is routed through the first slot 68 and connected to the strap wrench 66.

More specifically, an inefficient method for securing a strap member 64 of a strap wrench 66 about a conduit 74 is first insert the strap member 64 through the first slot 68, then position the conduit 74 between the inner and outer pipes 22 and 62 until an inner end (not depicted) of the conduit 74 engages a top wall 15 of a flange 12. The strap member 64 is then manually urged to a position about the conduit 74 with the hope of the person moving the strap member 64 that the conduit 74 does not prevent or otherwise restrict movement of the strap member 64 to the required position where the strap member is ultimately tightened about the conduit 74 by the strap wrench 66 positioned over and spanning the first slot 68.

Figure 10:
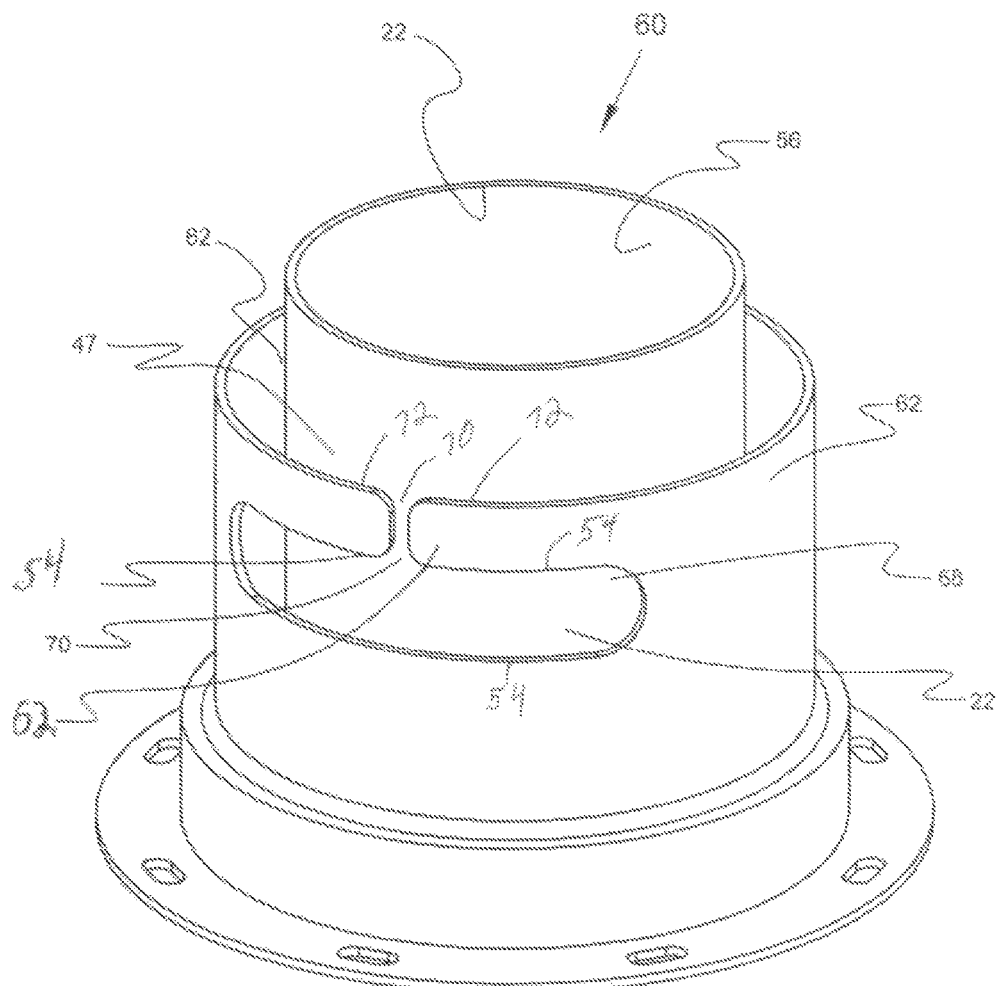
FIG. 10 is the top-side plan perspective view of FIG. 9, but with the inner and outer pipes rotated to provide an alternative view.
Figure 10A:
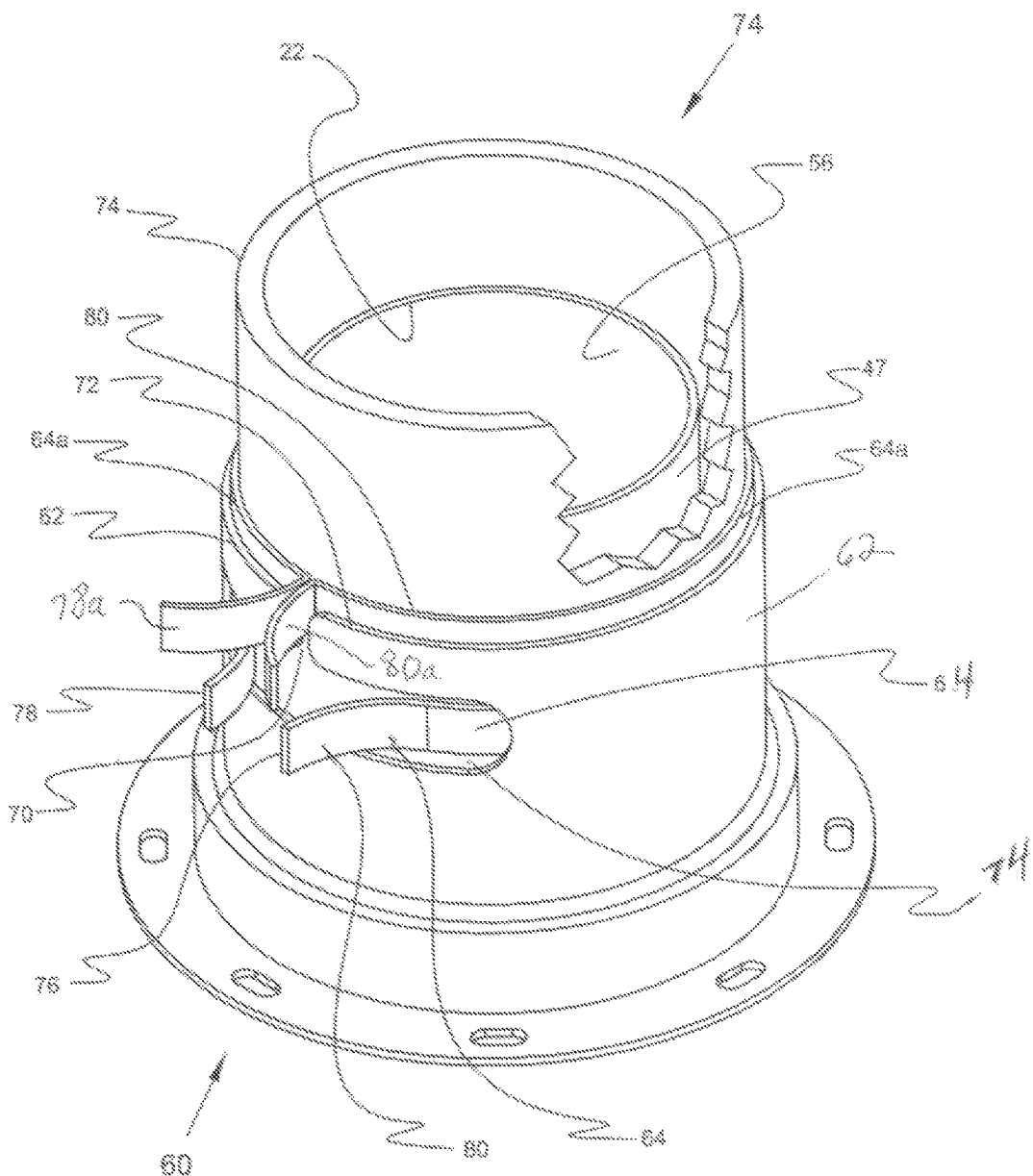
FIG. 10a is the top-side plan view of FIG. 10, but with a conduit inserted in the outer pipe and with a strap member disposed about the conduit in a first upper position and a second lower position.
Figure 11:
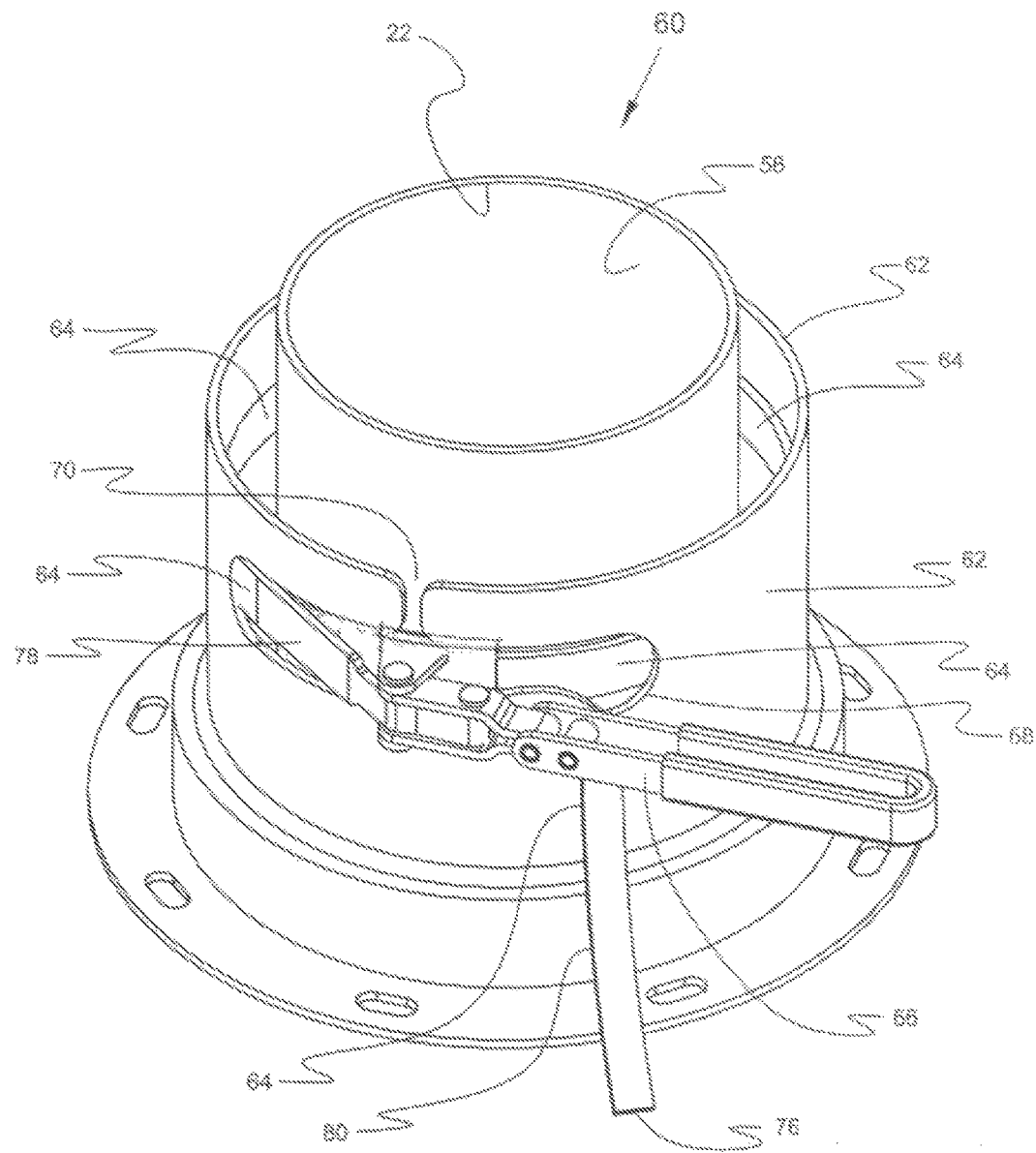
FIG. 11 is the top-side plan perspective view of FIG. 10, but with a strap wrench depicted in a tightened position in accordance with the present invention.
Figure 12:
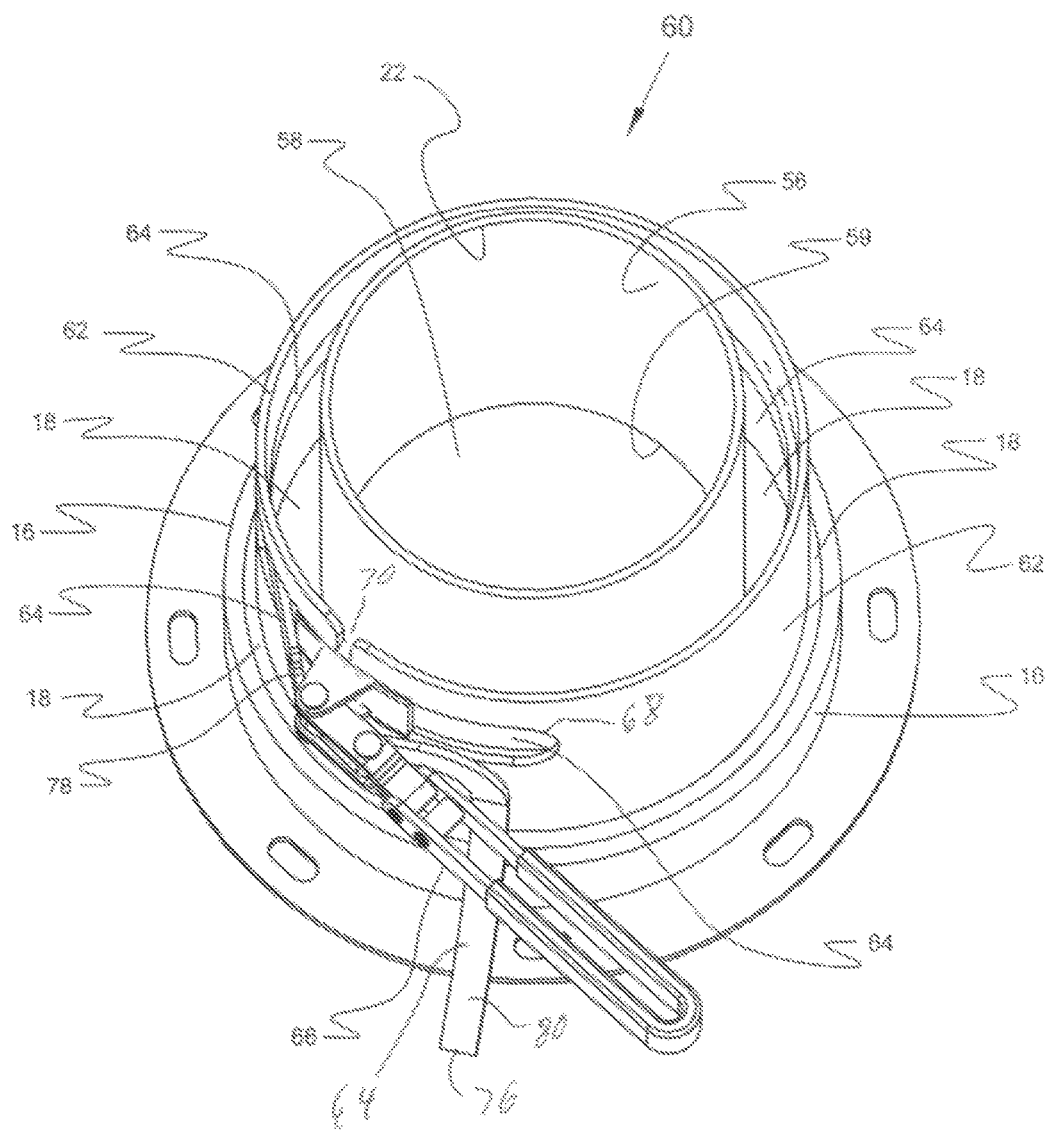
FIG. 12 is a top plan perspective view of an alternative pipe securing device with a strap wrench depicted in a tightened position in accordance with the present invention.
Figure 13:
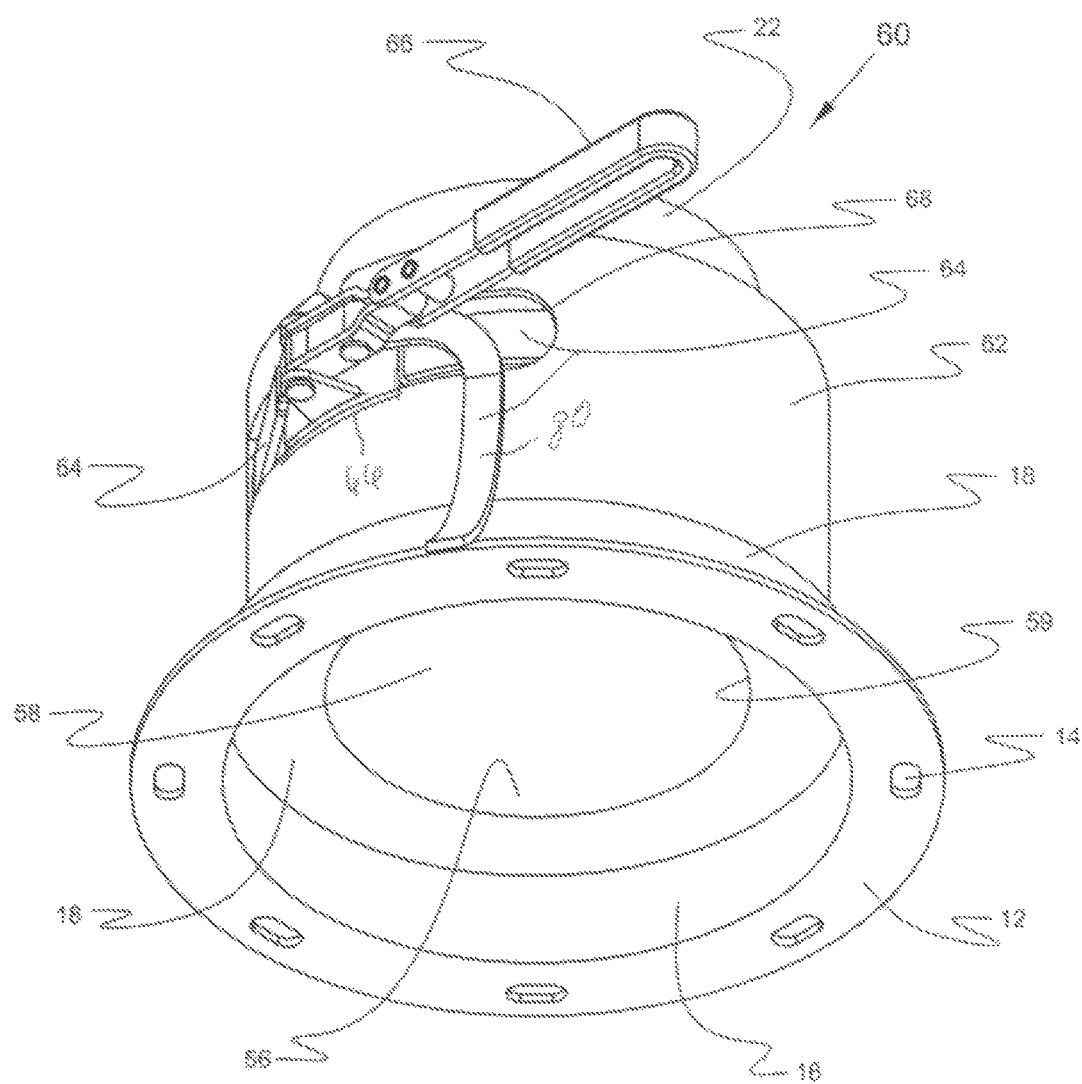
FIG. 13 is a bottom-side plan perspective view of an alternative pipe securing device with a strap wrench depicted in a tightened position in accordance with the present invention.
Figure 14:
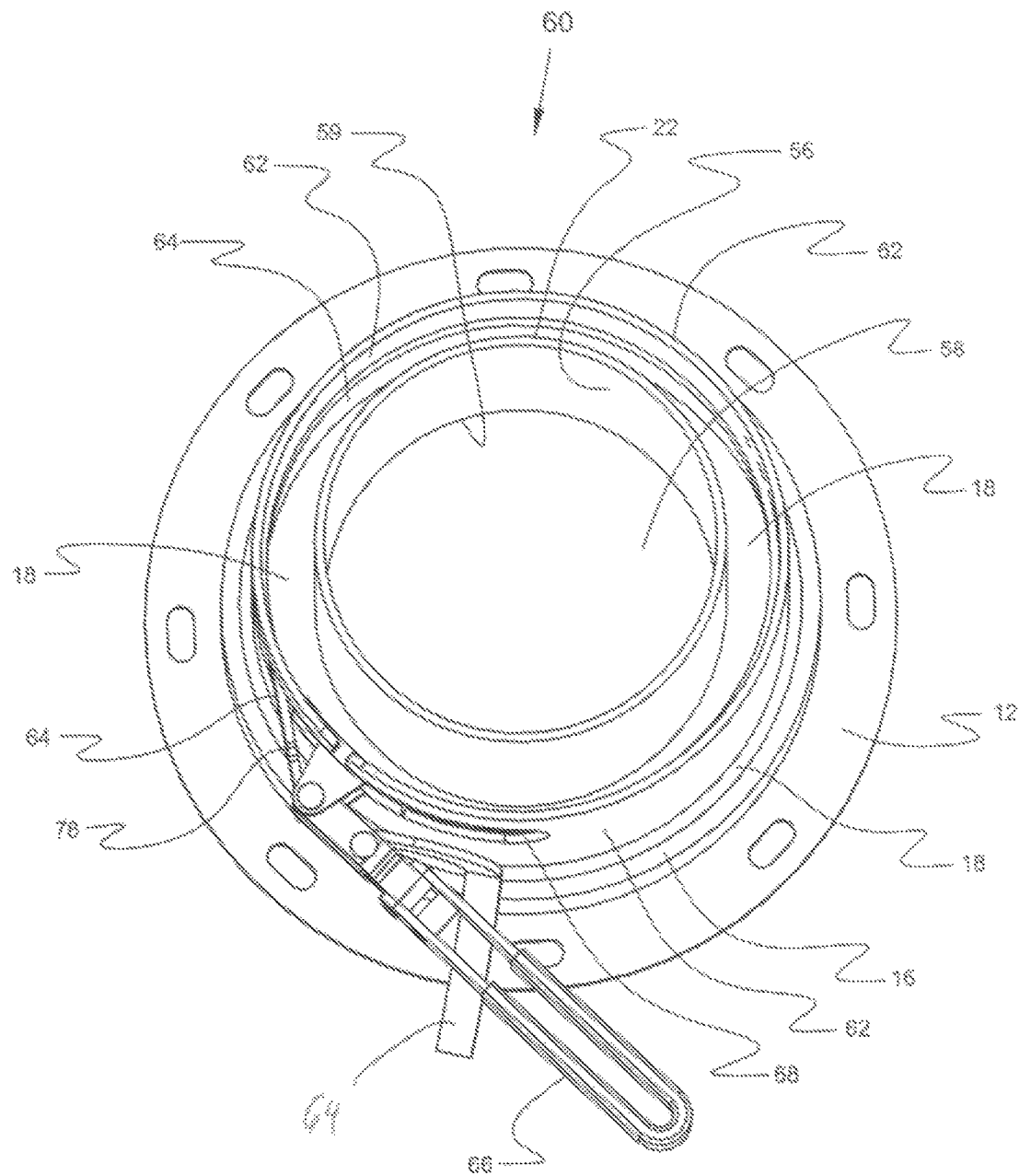
FIG. 14 is a top plan perspective view of an alternative pipe securing device with a flange circumferentially depicted and with a strap wrench depicted in a tightened position.

Referring to FIG. 10a. a strap member 64 is depicted without the strap wrench 66. FIG. 10a illustrates a more efficient method of wrapping a strap member 64 about a conduit 74. First, the conduit 74 is inserted between the inner and outer pipes 22 and 62 until the inner end of the conduit 74 engages the flange 12. Next, the strap member 64 is manually disposed about the conduit 74 in a first upper position where the strap member is identified as 64a. The strap member 64a is then slide downward upon the conduit 74 to a second lower position by urging downward through the second slot 70, first and second end portions 78a and 80a of the strap member 64a into the first slot 68, whereupon, the strap member is identified as numeral 64, and the first and second end portions are identified as numerals 78 and 80, respectively. The second end portion 80 of the strap member 64 is then secured to the strap wrench 66, whereupon, an operator manually urges the strap wrench 66 to a locked position that forcibly tightens the strap member 64 about the conduit 74 to maintain the position of the conduit 74 upon the inner pipe 22, irrespective of a positive pressure or vacuum pressure urging a liquid flow through the conduit 74.

FIGS. 15 and 16 depict a drain tile 4 in the alternate securing device 60 with the strap member 64 engaging the ribs 6 of the drain tile in a partially tightened position. When the strap wrench 66 is secured to the strap member 64 disposed in a totally tightened position about the drain tile 4, the strap member 64 will deform to completely engage the arcuate surface of a cooperating recess 8, thereby rigidly engaging the drain tile 4 with the inner pipe 22 and substantially maintaining the axial position of the drain tile 4 upon the inner pipe 22 via the strap wrench 66 spanning the first slot 68 and engaging the outer pipe 62 proximate to the edges 54 of the first slot 68.

FIG. 17 is a cutaway view depicting a relatively smooth cylindrical conduit 74 between the inner pipe 22 and the strap member 64, the strap member 64 being between the conduit 74 and the outer pipe 62. When the strap wrench 66 is secured to the strap member 64 in a totally tightened position about the conduit 74, the strap member 64 will frictionally engage the cylindrical surface of the conduit 74 with sufficient force to maintain engagement between the inner pipe 22 and the conduit 74. Further, the tightened strap member 64 will substantially maintain the axial position of the conduit 74 upon the inner pipe 22 via the strap wrench 66 spanning the first slot 68 and engaging the outer pipe 62 proximate to the edges 54 of the first slot 68. The use of the alternate securing device 60 is intended for positive pressure and vacuum systems operating within relatively small pressure ranges that pose no safety issues to the individuals operating the systems (the pressure ranges being well known to those of ordinary skill in the art).

In operation, a drain tile securing device 10 or conduit securing device 60 is used to connect a drain tile 4, conduit 74 or similar liquid transport vessel to a pressure source, generally a vacuum truck, to ultimately transfer a liquid from a holding location into the vacuum truck. Irrespective of the device 10 and 60 used, a method for transporting a vacuumed liquid and/or fluid to a suction source includes the steps of providing a flange 12 having a central aperture 13; securing an inner pipe 22 to the flange 12, said inner pipe 22 having a predetermined longitudinal dimension and diameter, said inner pipe being concentrically disposed about the central aperture 13 of the flange 12; securing an outer pipe 20 to said flange 12, said outer pipe having a predetermined longitudinal dimension and a diameter relatively larger than the diameter of the inner pipe 22, said outer pipe being concentrically disposed about the inner pipe 22, thereby forming an annulus 24 between the inner and outer pipes 22 and 20 for ultimately receiving an end portion of a drain tile 4; providing a radial slot 44 in the outer pipe 20; securing a latch subassembly 40 to an outer wall 55 of the outer pipe 20 proximate to the slot 44; pivotally securing one end of a rod connector assembly 42 to the latch subassembly 40, and pivotally securing an opposite end of the rod connector assembly 42 to a latch receiving end 34 of a securing rod 30; and pivotally securing a pivot end 28 of the securing rod 30 to a pivot mount assembly 26, whereby, the latch subassembly 40 is initially disposed in an open or unlatched position, resulting in the securing rod 30 being disposed outside the outer wall 55 of the outer pipe 20 in a released position to promote the insertion of an end portion of a drain tile 4 into the annulus 24, whereupon, the latch subassembly is disposed in a closed or latched position, resulting in the securing rod 30 being disposed in a secured position in a cooperating recess 8 of the drain tile 4 to urge the drain tile 4 into engagement with the inner pipe 22, thereby maintaining the proximate position of the drain tile 4 relative to the inner and outer pipes 22 and 20, irrespective of the liquid flow volume through the drain tile 4 and into the inner pipe 22, out the flange 12 and into the vacuum truck.

The foregoing description is for purpose of illustration only and is not intended to limit the scope of protection accorded this invention. The scope of protection is to be measured by the following claims, which should be interpreted as broadly as the inventive contribution permits

What is claimed is:

1. A securing device comprising:
   a flange configured for mounting on a suction-providing source;
   an outer pipe integrally joined to and extending outwardly from said flange, said outer pipe having a rod receiving slot extending radially about a portion of said outer pipe, said slot having a pivot end and a latch end;
   an inner pipe integrally joined to and extending outwardly from said flange such that said inner pipe is in fluid engagement with the suction-providing source when said flange is securely mounted to the suction-providing source;
   an annulus defined by the space between an inner wall of said outer pipe and an outer wall of said inner pipe, said annulus ultimately receiving an end portion of a corrugated pipe, said inner pipe being dimensioned to receive said end portion of said corrugated pipe such that said end portion can be simultaneously positioned within said outer pipe and over said inner pipe;
   a latch subassembly mounted on said outer pipe and positioned proximate to said slot latch end, said latch subassembly configured to be movable between a latched position and an unlatched position;
   a securing rod having a latching end and a pivoting end, said rod being pivotally connected to a rod connector assembly proximate to said slot pivot end, said rod being operatively associated with said latch subassembly so as to be movable from a latched position to an unlatched position; whereby, when said latch subassembly is in the unlatched position, said rod is in a released position, and when said latch subassembly is in the latched position, said rod is in a secured position.

2. The securing device of claim 1 wherein said flange includes a lift extension that extends perpendicularly and circumferentially from an inner wall of said flange in an axially aligned relationship with said flange, said lift extension being an annular offset with a relatively large diameter and relatively small axial dimension to provide sufficient working space for securing a shoulder upon an annular edge portion of said lift extension distal to an inner wall of said flange.

3. The securing device of claim 2 wherein said shoulder extends radially inward sufficiently to support, circumferentially receive and secure both said cylindrical outer pipe and said concentric inner pipe upon a top wall of said shoulder, thereby separating a bottom of said outer and inner pipes from said top wall of said flange a predetermined distance.

4. The securing device of claim 1 wherein said latch subassembly includes means for adjusting a biasing force generated by movement of a latch handle.

5. The securing device of claim 4 wherein said force adjusting means includes positioning four nuts disposed upon threaded portions of two longitudinal portions of said latch subassembly such that when tightening said four nuts upon the threaded portions both longitudinal portions, results in said latch handle subassembly being drawn toward said latch receiving end of said securing rod, thereby requiring said handle to travel a greater distance before said handle can be placed in a latched position, resulting in a greater bending force imparted upon a latch receiving end and correspondingly generating a greater force by said securing rod upon a drain tile.

6. The securing device of claim 1 wherein said securing rod includes said pivot end with a pivot aperture, a latch receiving end with a rod aperture, an arcuate pipe engagement mid-portion, and first and second off-set portions that enable said mid-portion to engage the drain tile inside said outer pipe with the latch subassembly in the latched position outside said outer pipe.

7. The securing device of claim 6 wherein said securing rod includes planar vertical side walls forming said pivot end and planar horizontal side walls forming said latch receiving end, said vertical side walls of said pivot end positioning said pivot aperture to receive and slide upon a pivot mount assembly horizontally disposed proximate to said slot pivot end, said horizontal side walls of said latch receiving end positioning a rod latch aperture to receive and slide upon a lateral portion of said rod connector assembly.

8. The securing device of claim 7 wherein said first offset portion is a lineal section that cooperates with said pivot end to form a relatively "V" shaped configuration with predetermined dimensions that results in said arcuate mid-portion being positioned in radial engagement with said cylindrical outer wall of said inner pipe when said latch subassembly is in a latched position and the drain tile is not disposed in said annulus.

9. The securing device of claim 8 wherein said second offset portion is a bend in said securing rod that results in said latch receiving end being disposed outside said outer wall of the outer pipe and proximate to a slot latch end to promote the connection of said receiving end with said rod connector assembly, said positioning of said latch receiving end outside said outer wall results in a bending of said latch receiving end as a latched position is approached by said latch subassembly until said arucate mid-portion totally engages said outer wall of said inner pipe, resulting in a bias being generated by said mid-portion upon a drain pipe disposed in said annulus that maintains the drain pipe upon said inner pipe, irrespective of the flow volume through the drain pipe.

10. The securing device of claim 1 wherein said rod receiving slot is circumferentially disposed about said outer pipe, said slot comprising:
   a lateral dimension defined by the distance separating substantially parallel opposing edges, said opposing edges being separated a distance ranging between one-half and one inch with the preferred separation distance being substantially about three-fourths of an inch; and
   a circumferential distance that allows said securing rod to be inserted into said slot without engaging a slot pivot end and a slot latch end; said edges, pivot end and latch end cooperating to provide a slot sufficiently sized to allow said securing rod to longitudinally insert into said slot without engaging said pivot and latch ends, said securing rod ultimately being urged into said slot via movement of said latch subassembly to a latched position, whereupon, said rod is forcibly disposed into a cooperating recess of the drain tile to maintain the drain tile upon said inner pipe.

11. A method for transporting a vacuumed liquid to a suction source, said method comprising the steps of:

providing a flange having a central aperture;

securing an inner pipe to the flange, said inner pipe having a predetermined longitudinal dimension and diameter, said inner pipe being concentrically disposed about said central aperture of said flange;

securing an outer pipe to said flange, said outer pipe having a predetermined longitudinal dimension and a diameter relatively larger than the diameter of said inner pipe, said outer pipe being concentrically disposed about said inner pipe, thereby forming an annulus between said inner and outer pipes for ultimately receiving an end portion of a drain tile;

providing a slot in said outer pipe;

securing a latch subassembly to an outer wall of said outer pipe proximate to said slot;

securing one end of a rod connector assembly to said latch subassembly, and securing an opposite end of said rod connector assembly to a latch receiving end of a securing rod; and securing a pivot end of said securing rod to a pivot mount assembly, whereby, said latch subassembly is initially disposed in an open or unlatched position, resulting in said securing rod being disposed outside said outer wall of said outer pipe in a released position to promote the insertion of an end portion of a drain tile into said annulus, whereupon, said latch subassembly is disposed in a closed or latched position, resulting in said securing rod being disposed in a secured position in a cooperating recess of the drain tile to urge the drain tile into engagement with said inner pipe, thereby maintaining the proximate position of the drain tile relative to said inner and outer pipes, irrespective of the liquid flow volume through the drain tile and into the inner pipe then ultimately into a vacuum truck.

12. The method of claim 11 wherein said step of providing the flange includes the step of securing a lift extension to said flange that extends perpendicularly and circumferentially from an inner wall of said flange in an axially aligned relationship with said flange, said lift extension being an annular offset with a relatively large diameter and relatively small axial dimension to provide sufficient working space for securing a shoulder upon an annular edge portion of said lift extension distal to an inner wall of said flange.

13. The method of claim 12 wherein said step of securing the shoulder upon the annular edge portion of said lift extension includes the step of extending said shoulder radially inward toward a central longitudinal axis of said shoulder a distance sufficient to support, circumferentially receive and secure both said cylindrical outer pipe and said concentric inner pipe upon a top wall of said shoulder, thereby separating a bottom of said outer and inner pipes from said top wall of said flange a predetermined distance.

14. The method of claim 11 wherein said step of providing said slot in said outer pipe includes the step of providing said slot with a lateral dimension defined by the distance separating substantially parallel opposing edges, said opposing edges being separated a distance ranging between one-half and one inch with the preferred separation distance being substantially about three-fourths of an inch; and providing said slot with a circumferential distance that allows said securing rod to be inserted into said slot without engaging a slot pivot end and a slot latch end; said edges, pivot end and latch end cooperating to sufficiently size said slot to allow said securing rod to longitudinally insert into said slot without engaging said pivot and latch ends, said securing rod ultimately being urged into said slot via movement of said latch subassembly to a latched position, whereupon, said rod is forcibly disposed into a cooperating recess of the drain tile to maintain the drain tile upon said inner pipe.

15. The method of claim 11 wherein said step of securing one end of a rod connector assembly to said latch subassembly, and securing an opposite end of said rod connector assembly to said latch receiving end of said securing rod includes the step of providing said securing rod with a pivot end with a pivot aperture, said latch receiving end with a rod aperture, said securing rod with an arcuate pipe engagement mid-portion, and said securing rod with first and second off-set portions that enable said mid-portion to engage the drain tile inside said outer pipe with said latch subassembly in said latched position outside said outer pipe.

16. The method of claim 15 wherein said step of providing said securing rod includes the step of providing said securing rod with planar vertical side walls forming said pivot end and planar horizontal side walls forming said latch receiving end, said vertical side walls of said pivot end positioning said pivot aperture to receive and slide upon a pivot mount assembly horizontally disposed proximate to said slot pivot end, said horizontal side walls of said latch receiving end positioning a rod latch aperture to receive and slide upon a lateral portion of said rod connector assembly.

17. The method of claim 16 wherein said step of providing said securing rod includes the step of providing said first offset portion with a lineal section that cooperates with said pivot end to form a relatively "V" shaped configuration with predetermined dimensions that results in said arcuate mid-portion being positioned in radial engagement with said cylindrical outer wall of said inner pipe when said latch subassembly is in said latched position and the drain tile is not disposed in said annulus.

18. The method of claim 17 wherein said step of providing said second offset portion includes the step of providing said second offset portion with a bend in said securing rod that results in said latch receiving end being disposed outside said outer wall of the outer pipe and proximate to a slot latch end to promote the connection of said latch receiving end with said rod connector assembly, said positioning of said latch receiving end outside said outer wall results in a bending of said latch receiving end as said latched position is approached by said latch subassembly until said arucate mid-portion totally engages said outer wall of said inner pipe, resulting in a bias being generated by said mid-portion upon the drain tile disposed in said annulus that maintains the drain pipe upon said inner pipe, irrespective of the flow volume through the drain pipe.

19. A method for constructing a conduit securing device that connects a conduit to a vacuum truck to increase the distance the vacuum truck can engage and remove a liquid volume, said method comprising the steps of:

providing a flange having a central aperture, said flange ultimately being secured to the vacuum truck;

securing an inner pipe to said flange, said inner pipe having a predetermined longitudinal dimension and diameter, said inner pipe being concentrically disposed about said central aperture of said flange;

securing an outer pipe to said flange, said outer pipe having a predetermined longitudinal dimension and a diameter relatively larger than the diameter of said inner pipe, said outer pipe being concentrically disposed about said inner pipe, thereby forming an annulus between said inner and outer pipes for ultimately receiving an end portion of a drain tile;

providing a slot in said outer pipe;

disposing a strap member about a conduit inserted into said annulus;

connecting said strap member to a strap wrench after routing first and second end portions of said strap member through said slot after disposing said strap member about the conduit; and tightening said strap member about the conduit via said strap wrench, whereby the position of the conduit is maintained relative to said inner pipe via said strap wrench being locked to maintain said strap member in a tightened position about the conduit, whereupon, irrespective of the liquid flow volume through the conduit and into and out of said inner pipe, said conduit securing device maintains liquid flow continuity between a suction end of the conduit disposed in the liquid volume and the vacuum truck.

20. The method of claim 19 wherein said step of securing an outer pipe to said flange includes the step of providing the outer pipe with first and second slots for promoting the routing of first and second end portions of said strap member through said first slot, after the conduit has been disposed into said annulus followed by the disposing of said strap member about the conduit, said strap member ultimately being secured to and tightened by said strap wrench after said strap wrench is disposed upon the outer wall of said outer pipe proximate to said second slot.

* * * * *